United States Patent
Cheng et al.

(10) Patent No.: US 10,180,614 B2
(45) Date of Patent: Jan. 15, 2019

(54) PI-CELL POLARIZATION SWITCH FOR A THREE DIMENSIONAL DISPLAY SYSTEM

(71) Applicant: zSpace, Inc., Sunnyvale, CA (US)

(72) Inventors: HsienHui Cheng, Sunnyvale, CA (US); Thanh-Son Nguyen, Santa Clara, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

(21) Appl. No.: 15/650,117

(22) Filed: Jul. 14, 2017

(65) Prior Publication Data

US 2018/0017820 A1 Jan. 18, 2018

Related U.S. Application Data

(60) Provisional application No. 62/363,076, filed on Jul. 15, 2016.

(51) Int. Cl.

| | | |
|---|---|---|
| *G02F 1/139* | (2006.01) | |
| *G02F 1/1335* | (2006.01) | |
| *G02B 27/00* | (2006.01) | |
| *G02B 27/26* | (2006.01) | |
| *H04N 13/302* | (2018.01) | |
| *H04N 13/337* | (2018.01) | |
| *G06F 3/01* | (2006.01) | |
| *H04N 13/366* | (2018.01) | |

(Continued)

(52) U.S. Cl.
CPC ....... *G02F 1/1395* (2013.01); *G02B 27/0068* (2013.01); *G02B 27/26* (2013.01); *G02F 1/133528* (2013.01); *G06F 3/01* (2013.01); *H04N 13/302* (2018.05); *H04N 13/337* (2018.05); *H04N 13/366* (2018.05); *G02B 27/0093* (2013.01); *G02F 2001/133541* (2013.01); *H04N 13/344* (2018.05); *H04N 13/383* (2018.05); *H04N 2213/008* (2013.01)

(58) Field of Classification Search
CPC .. H04B 10/505; H04N 9/3105; G02F 1/0123; G02F 1/0136
USPC .......................................... 359/249
See application file for complete search history.

(56) References Cited

U.S. PATENT DOCUMENTS

| | | |
|---|---|---|
| 2005/0237472 A1 | 10/2005 | Shibahara |
| 2009/0009593 A1 | 1/2009 | Cameron |

OTHER PUBLICATIONS

BLiquid Crystal Technologies; Pi Cell (Optically Compensated Bend—OCB Cell); http://www.liquidcrystaltechnologies.com/tech_support/Pi_Cell.htm; Aug. 5, 2008, three pages..

*Primary Examiner* — Mohammed A Hasan
(74) *Attorney, Agent, or Firm* — Meyertons Hood Kivlin Kowert & Goetzel, P.C.; Jeffrey C. Hood; Brian E. Moore

(57) ABSTRACT

Techniques are disclosed relating to the transmission of data based on a polarization of a light signal. In some embodiments, data may include 3D video data for viewing by a user. Systems for transmitting data may include a display device and a device for switching the polarization of a video source. Systems for receiving data may include eyewear configured to present images with orthogonal polarization to each eye. In some embodiments, the rate of switching of the polarization switcher may introduce a distortion to the optical data. A Pi-cell device may be used in some embodiments to reduce distortion based on switching speed. In some embodiments, polarization switchers may introduce a distortion based on the frequency of transmitted light. In some embodiments, optical elements including in the transmitting or receiving devices may be configured to reduce distortions based on frequency.

20 Claims, 19 Drawing Sheets

(51) Int. Cl.
*H04N 13/383* (2018.01)
*H04N 13/344* (2018.01)

PI-CELL POLARIZATION SWITCH FOR A THREE DIMENSIONAL DISPLAY SYSTEM

PRIORITY DATA

This application claims benefit of priority to U.S. Provisional Application Ser. No. 62/363,076, titled "Optical Design to Use a Pi-cell as a Fast Response Polarization Switcher in a Three Dimensional Display System", filed Jul. 15, 2016, by HsienHui Cheng and Thanh-Son Nguyen, which is hereby incorporated by reference in its entirety as though fully and completely set forth herein.

TECHNICAL FIELD

This disclosure relates to the field of digital display and more particularly to methods and systems for an optical design to use a Pi-cell as a fast response polarization switcher in a three dimensional (3D) display system.

DESCRIPTION OF THE RELATED ART

Three dimensional (3D) displays (actually, simulated 3D, e.g., via stereoscopic display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255. This component may also scale an image from the input resolution to a different, rendered resolution supported by the display.

3. Panel—This component is the display itself, typically a liquid crystal display (LCD), though other displays are possible, and takes as input the video levels (e.g., for R, G and B) output from the scaler for each pixel, and converts the video levels to voltages, which are then delivered to each pixel on the display. The panel itself may modify the video levels before converting them to voltages.

The video chain generally modifies the video levels in two ways, specifically gamma correction and overdrive. Note that the functionality described above is typically implemented in the scaler, but is sometimes implemented at least partially in other devices or elements of the video chain, e.g., in the GPU or display device (panel). That is, the video scalar may be optional in some embodiments.

Time Sequential Stereo Displays

Unlike a normal (i.e., monoscopic) display, in a stereo display, there are two images for each video frame: right and left. The right image is delivered to only an observer's right eye, and the left image is delivered to only the observer's left eye. In a time sequential stereo display, this separation of right and left images is performed in time, i.e., the left and right images are presented sequentially, and thus, contains some time-dependent element which separates these two images. There are two common architectures for stereo displays.

The first architecture uses a device called a polarization switch (PS), which may be a distinct (i.e., separate) or integrated LC device or other technology switch and which is placed in front of the LCD panel (or any other type of imaging panel, such as an OLED (organic light emitting diode) panel, a plasma display, etc.) or any other pixelated panel display used in a time-sequential stereo imaging system. Specifically, the PS may be placed between the display panel and the viewer, as shown in FIG. 2A. The purpose of the PS is to switch the light transmitted from the display panel between two orthogonal polarization states. For example, one of these states may be horizontally linearly polarized light (i.e., the light may be in a horizontal linear polarization state), and the other may be vertically linearly polarized light (i.e., the light may be in a vertical linear polarization state); however, other options are possible (e.g., left and right circular polarization states, etc.). The key feature that allows the PS to deliver the correct image to the correct eye of the viewer (i.e., the left image to the left eye and the right image to the right eye) is that the two polarization states are orthogonal to each other.

This architecture allows achievement of the stereo effect shown in prior art FIG. 2B. As may be seen, the top portion of the figure shows the (display) panel switching between a left image and a right image. Synchronous with the panel switching, the PS is switching the light being transmitted between a left state and a right state, as shown. These two states emit two corresponding orthogonal polarization states, as explained above. As FIG. 2B further shows, the system may include stereoscopic eyewear that is designed such that the left lens will only pass the left state polarization and the right lens will only pass the right state polarization. In this way, separation of the right and left images is achieved.

The second conventional architecture may use stereoscopic shutter glasses, which replace (or integrate the functionality of) the PS and eyewear. In such systems, each eye is covered by an optical shutter, which can be either open or closed. Each of these shutters is cycled between opened and closed synchronously with the display panel in such a way that when the left image is shown on the display, only the left eye shutter is open, and when the right image is shown on the display, only the right eye shutter is open. In this manner, the left and right views are alternatingly presented to the user's left and right eye, respectively. The alternate presentation of left and right views to the user's left and right eyes creates the perception of visual depth. Virtual objects may be displayed in this created 3D space, which exists both above the 3D stereoscopic display panel (i.e., negative space) and below the stereoscopic display panel (i.e., positive space).

SUMMARY

Stereoscopic images and/or auto-stereoscopic images may be transmitted for viewing by the user. By presenting such images, the display system may present a three dimensional (3D) scene for the user. The 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear which may include polarized lenses. With polarized lenses, images are presented for each eye using orthogonal polarizations, and each lens of the eyewear may have a corresponding orthogonal polarization for receiving a corresponding image.

Some embodiments of 3D video transmission may include a device for switching the polarization of a video source. In some embodiments, the rate of switching of the polarization switcher may introduce a distortion to the 3D image. A Pi-cell device may be used in some embodiments to reduce distortion based on switching speed. In some embodiments, polarization switchers may introduce a distortion based on the frequency of transmitted light. In some embodiments, optical elements, for example quarter wave plates, half wave plates, etc., may be configured to reduce distortions based on frequency.

Various embodiments are presented of systems/methods for an optical design to use a Pi-cell as a polarization switcher in a three dimensional (3D) display system. In some embodiments, Pi-cells may be included as polarization switchers for transmitting optical data, including but not limited to 3D display data.

In some embodiments, for example, a system may include a processor, a display device, and a wearable device. The processor may be configured to process video data for display and the display device may include at least one optical element and may be configured to transmit an optical signal. The at least one optical element may be configured to change a polarization value in response to an electrical signal. In some embodiments, the at least one optical element of the display device may include a Pi-cell. The wearable device may be configured to cover at least two eyes and may include at least two optical elements. Properties of the first and second optical elements may be respectively determined based (at least in part) on reducing a measure of distortion in the transmitted optical signal. In some embodiments, the wearable device may be further configured to polarize light transmitted via the at least one optical element. In some embodiments, a first optical element may have (or be configured with) a first polarization value and a second optical element may have (or be configured with) a second polarization value.

BRIEF DESCRIPTION OF THE DRAWINGS

A better understanding of the present disclosure can be obtained when the following detailed description of the preferred embodiment is considered in conjunction with the following drawings, in which.

Figure 1:
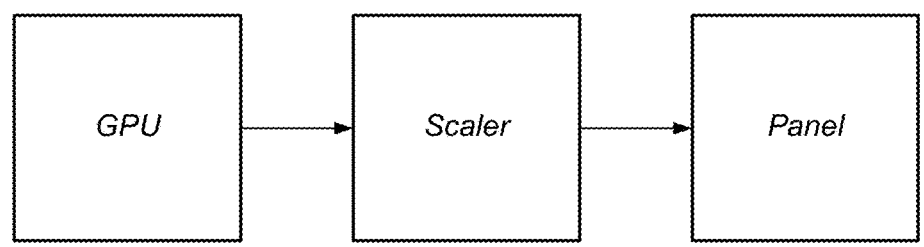
FIG. 1 illustrates a modern display chain, according to the prior art.
Figure 2A:
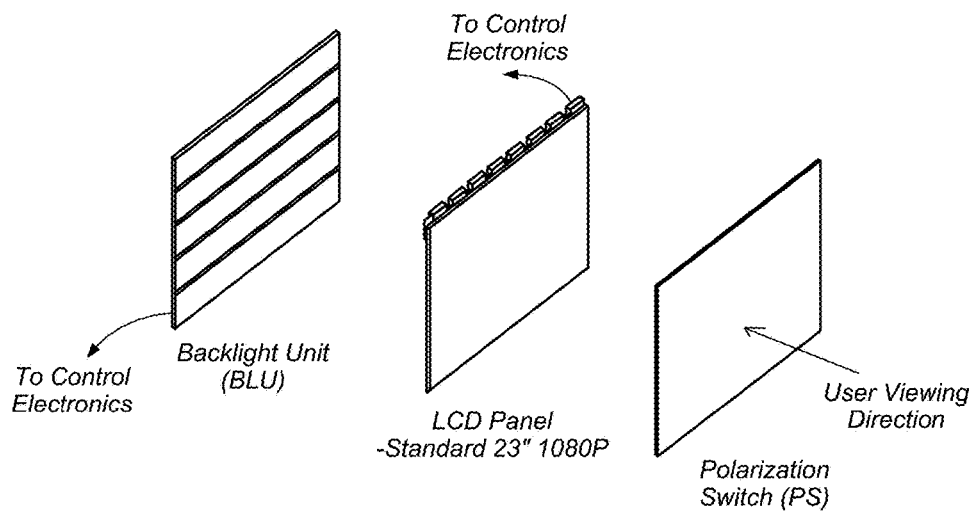
FIG. 2A illustrates an example of an architecture that utilizes a polarization switch, according to the prior art.
Figure 2B:
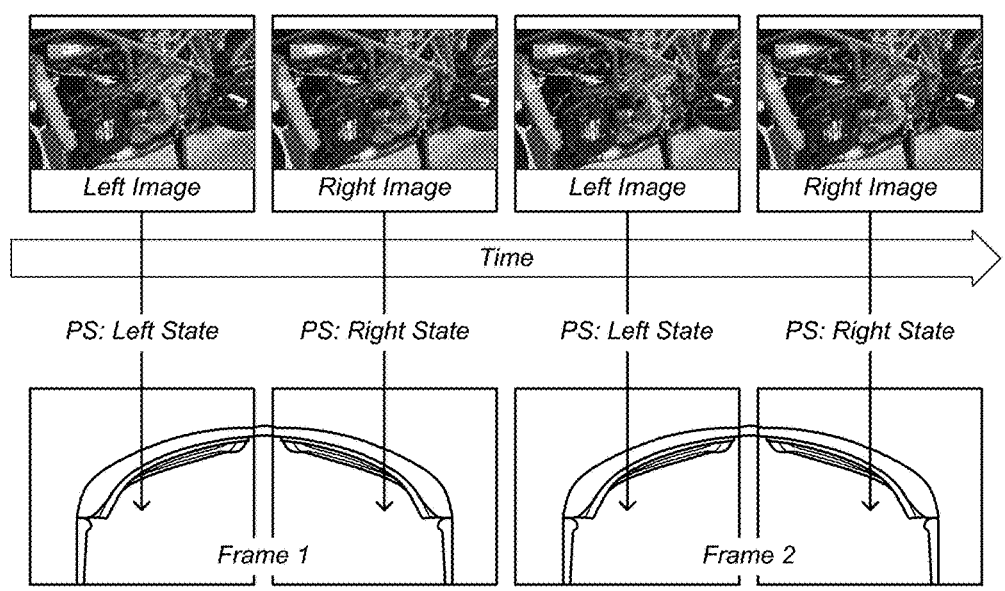
FIG. 2B illustrates an example of a stereo effect (simulated 3D) using polarization switching between left and right views, according to the prior art.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a computer system as defined above (e.g., a personal computer, workstation, server, graphics server, or equivalent), and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Mobile Device (or Mobile Station or Personal Electronic Device)—any of various types of computer systems or devices that are mobile or portable and that performs wireless communications using WLAN and/or cellular communication. Examples of mobile devices include mobile telephones or smart phones (e.g., iPhone™ Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN and/or cellular communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" or "Wireless Local Area Network" has the full breadth of its ordinary meaning, and at least includes a wireless communication network or Radio Access Technology (RAT) that is serviced by WLAN access points and which provides connectivity through these access points to the Internet. Most modern WLANs are based on IEEE 802.11 standards and are marketed under the name "Wi-Fi." A WLAN network is different from a cellular network.

Functional Unit (or Processing Element)—refers to various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Coupled Zone—refers to a physical volume in which the user of a 3D stereoscopic display can view 3D content within the human eye's natural depth of field. When a person sees an object in the physical world, the person's eyes converge on, or look (individually aim) at, the object. Additionally, as the two eyes converge on the object, each eye's lens also focuses, via accommodation, (monoscopically) on the object. In this sense, both eyes focus and converge on the object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers to the display of a 3D object, or content, on a two dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—refers to or specifies a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking system (which may identify and track, among other things, the user's view) may identify the position/orientation of the user's view, and this information may then be correlated to the tracking system's identification of the viewing device's position/orientation (again, with respect to the display device).

Vertical Perspective—a perspective effect rendered from a viewpoint which is substantially perpendicular to the display surface. "Substantially perpendicular" refers to 90 degrees or variations thereof, such as 89 or 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective effect rendered from a viewpoint which is not perpendicular to the display surface. More particularly, the term "horizontal perspective" may typically refer to a perspective effect which is rendered using a substantially 45 degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in embodiments of the present techniques relates to the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define a camera point of the frustum in relation to the render plane. The resultant projection is then rendered onto the viewing device as will be seen by the user.

Position—the location or coordinates of an object (either virtual or real). For example, position may include x, y, and z (i.e., location) coordinates within a defined space. The position may be relative or absolute, as desired. Position may also include yaw, pitch, and roll information, e.g., when defining the orientation of a viewpoint. In other words, position is defined broadly so as to encompass information regarding both location and orientation.

Stylus—a peripheral device or element such as a handheld device, handheld pen device, handheld pointing device, hand, finger, glove, or any object used to directly interact with rendered virtual objects as in a stereo rendered virtual projected objects.

Similar—as used herein in reference to geometrical shapes, refers to the geometrical term indicating that objects have the same shape, or that one object has the same shape as the mirror image of the other object. In other words, objects are considered similar if one object may be obtained from the other by uniformly scaling (enlarging or shrinking) the object. Additionally, the term similar, or similar objects, means that either object may be rescaled, repositioned, and reflected, so as to coincide with the other object. Thus, for example, if a first object is geometrically similar to a second object, i.e., has the same shape but possibly a different size, then either object may be uniformly scaled to obtain the geometrical size and shape of the other object. Thus, the first object may be uniformly scaled to obtain the second object or the second object may be uniformly scaled to obtain the first object. Note that this definition of similar only refers to the use of the word in the context of geometrical shapes and retains it ordinary meaning in other contexts (e.g., system A is similar to system B implies that system A resembles system B without being identical to system B).

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Proximate—near to; for example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism," where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including." As used in the appended claims, this term does not foreclose additional elements, structure, or steps. Consider a claim that recites: "A system comprising a display . . . ." Such a claim does not foreclose the system from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

This specification may include references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

FIGS. 3-6 Exemplary Systems

Figure 3:
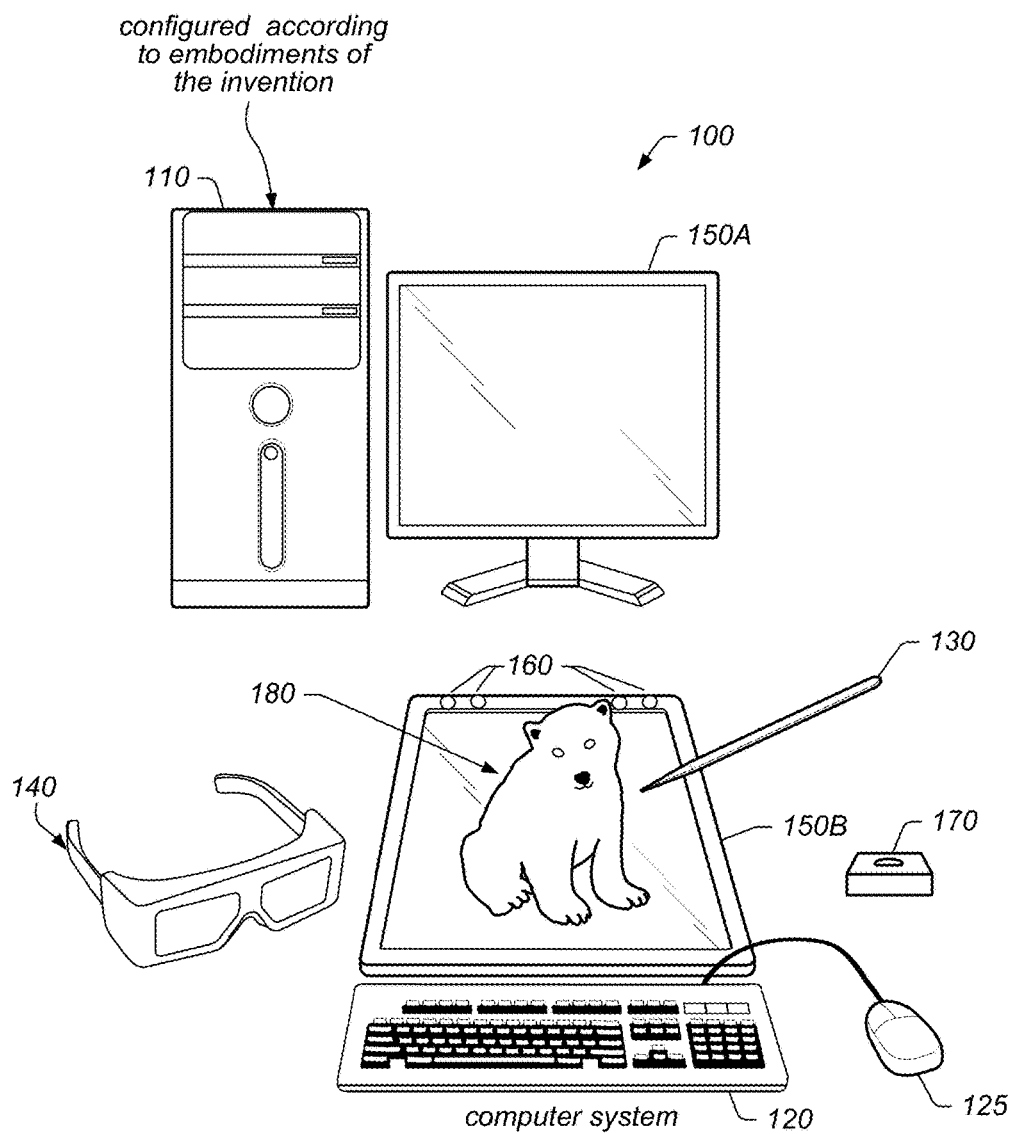
FIG. 3 illustrates an example 3D stereoscopic display system configured according to some embodiments.

FIG. 3 illustrates an exemplary system configured to implement various embodiments of the techniques described below.

In the exemplary embodiment of FIG. 3, system 100 may include chassis 110, display 150A and display 150B (which may collectively be referred to as display 150 or "one or more displays" 150), keyboard 120, mouse 125, user input device 130, eyewear 140, at least two cameras 160, and caddy 170. Note that in some embodiments, two displays 150A and 150B may not be used; instead, for example, a single display 150 may be used. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110 may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the system 100 may be configured to display a three dimensional (3D) scene (e.g., via stereoscopic images), or 3D content, such as scene 180, using the display 150A and/or the display 150B. The system 100 may also be configured to display a "view" of the 3D scene using the display 150A, the display 150B, and/or another display, as described in more detail below. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of Figure is exemplary only, and other numbers of displays are also envisioned. For example, the system 100 may include only a single display or more than two displays, or the displays may be arranged in different manners than shown, e.g., as goggles or other wearable eyewear or headgear as further described below in reference to FIG. 5. In this particular embodiment, the display 150A is configured as a vertical display (which may be perpendicular or approximately perpendicular to a user's line of sight) and the display 150B is configured as a horizontal display (which may be parallel (or approximately parallel) or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images that are presented according to a horizontal perspective. Descriptions of horizontal and vertical perspectives are provided herein (see, e.g., the above Terms section). Additionally, while the displays 150 are shown as flat panel displays, in other embodiments, they may be any type of device or system which is capable of displaying images, e.g., projection systems. For example, display(s) 150 may be or include a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images and/or auto-stereoscopic images for viewing by the user. By presenting such images, the display(s) 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others. In some embodiments, the display(s) 150 may be included (or incorporated) in the eyewear (or other wearable headgear). In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display(s) 150 and the point of view of the user may be used to map a portion of the virtual space to the physical space of the system 100. In essence, the physical space and components used may be mapped to the virtual model in order to accurately render a 3D scene of the virtual space.

One or more of the user input devices (e.g., the keyboard 120, the mouse 125, the user input device 130, pointing device, user control device, user hand/fingers, personal electronic device, etc.) may be used to interact with the presented 3D scene. As further described herein, a personal electronic device may serve as at least one of the one or more user input devices. In other words, a personal electronic device may supplement and/or replace other potential user input devices (e.g., a stylus). The user input device 130 (shown as a stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100 may include one or more sensors 160. The one or more sensors 160 may be included in a tracking system. FIG. 3 illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, all four cameras 160 may be used to sense all tracked targets (e.g., a user point of view and a user input device). In other words, all four cameras 160 may work in conjunction rather than two cameras tracking one target and the remaining two cameras tracking the other target. Alternatively, fewer than four sensors may be used (e.g., two sensors), wherein each sensor may track both the user (e.g., the user's head and/or the user's point of view) and the user input device. Sensors 160 may be used to image a user of system 100, track a user's movement, or track a user's head or eyes, among other contemplated functions. In one embodiment, cameras 160 may track a position and/or an orientation of user input device 130 and/or a user's hands. The information regarding the position (including the orientation) of the user input device 130 and/or the user's hands provided by the one or more sensors 160 may be used in conjunction with other positional information of the system (e.g., an accelerometer and/or gyroscope within the stylus itself) to perform more precise 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. According to some embodiments, system 100 may optionally include a caddy 170 to store user input device 130. Caddy 170 may be used to hold, store, and/or calibrate the stylus (e.g., calibrate the orientation of the stylus to a known roll, pitch, and yaw, and so may be in a fixed position relative to cameras 160). Note that caddy 170 may not be required to calibrate the orientation of the stylus.

In one embodiment, the system 100 may be configured to couple to a network, such as a wide area network, via an input. The input may be configured to receive data (e.g., image data, video data, audio data, etc.) over the network from a system similar to system 100. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110 to determine a position or a POV, e.g., via execution of one or more programs by or on a processor or functional unit of chassis 110, although in other embodiments the tracking system may operate independently, e.g., may have its own processor or functional unit.

In certain embodiments, the system may include components implementing a perspective based image capture system, for capturing images of a target object at a location remote from the system. For example, the perspective based image capture system may include an input configured to couple to a network for receiving information regarding a point of view (POV) from a tracking system at a remote location. The information regarding the POV may indicate a position of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110 may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110.

Thus, the system 100 may present a 3D scene with which the user may interact in real time. The system may include real-time electronic display(s) 150 that may present or convey perspective images in the open space, and user input device 130 that may allow the user to interact with the 3D scene with hand controlled or hand-held tools. The system 100 may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

Further, while the system 100 is shown as including horizontal display 150B because it simulates the user's visual experience with the horizontal ground, other viewing surfaces may offer similar 3D illusion experiences. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100) may be used as desired.

Figure 4:
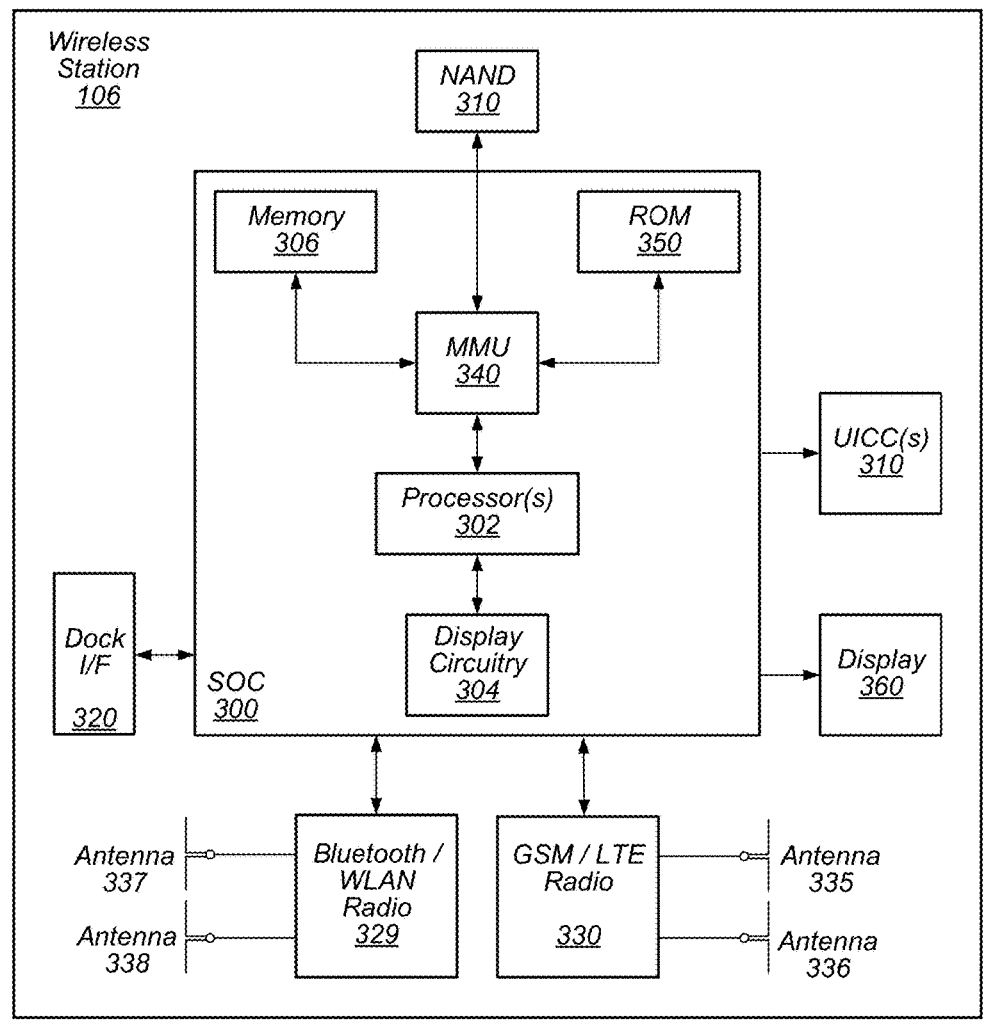
FIG. 4 illustrates an example block diagram of a user equipment device configured according to some embodiments.

FIG. 4 illustrates an example simplified block diagram of a wireless station 106. According to embodiments, wireless station 106 may be a user equipment (UE) device, a mobile device, and/or mobile station. Wireless station 106 may be used in conjunction with the system described above in reference to FIG. 3 and the systems described below in reference to FIG. 7. For example, wireless station 106 may be configured as an input device to any of the described systems (e.g., wireless station 106 may be configured as a user input device). As another example, according to some embodiments, wireless station 106 may be configured as a display of any of the described systems. Thus, wireless station 106 may be configured to display a stereoscopic image. In some embodiments, wireless station 106 may be configured to communicate with a 3D system either wirelessly (e.g., via a local area network such as a WiFi, Bluetooth, or Bluetooth low energy connection) or via a wired interface such as a universal serial bus interface, among other wired interfaces.

As shown, the wireless station 106 may include a system on chip (SOC) 300, which may include portions for various purposes. The SOC 300 may be coupled to various other circuits of the wireless station 106. For example, the wireless station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The wireless station 106 may further include one or more smart cards 310 that incorporate SIM (Subscriber Identity Module) functionality, such as one or more UICC(s) (Universal Integrated Circuit Card(s)) cards. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the wireless station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As described herein, the wireless station 106 may include hardware and software components for implementing the features described herein, e.g., the wireless station 106 may form at least part of a 3D display system such as system 100 described above and/or systems 500A and 5B described below. For example, the processor 302 of the wireless station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Figure 5A:
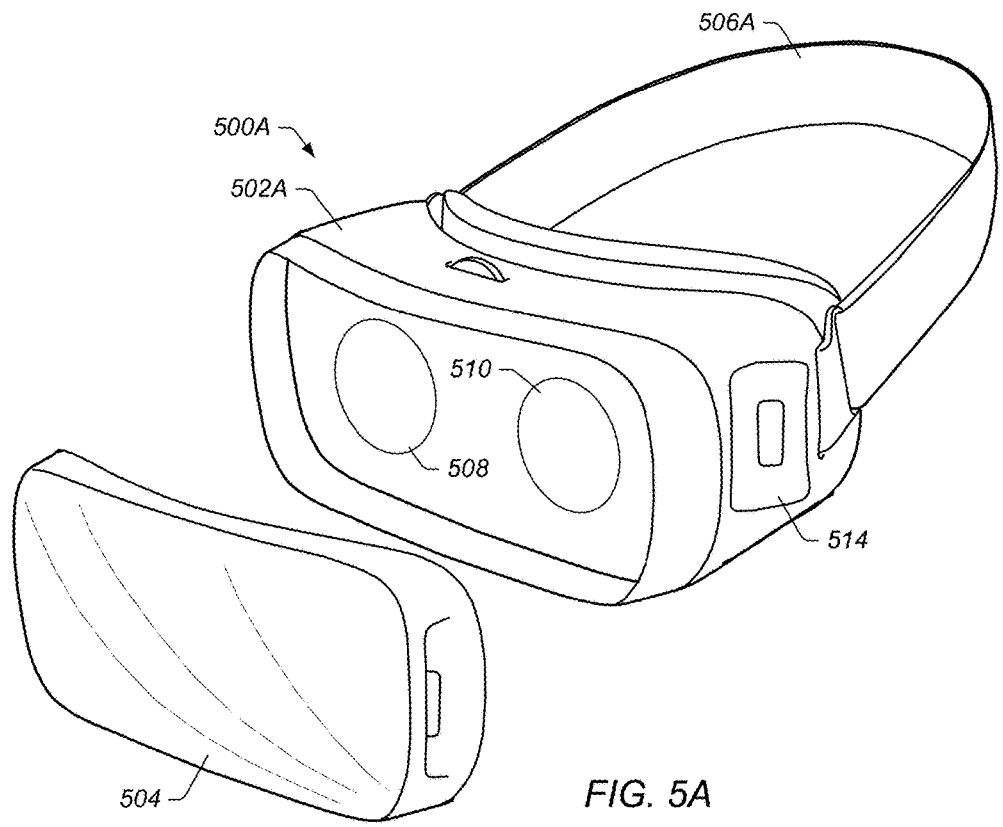
FIGS. 5A and 5B illustrates examples of a 3D head-mounted stereoscopic display system configured according to embodiments.

Referring to FIG. 5A, a head-mounted electronic device 500A may include a body 502A and a cover 504. The body 502 may include lenses 508 and 510, and a control device 514. In addition, electronic device 500A may include a support 506A which may be configured to support electronic device 500A on a user's head. Lenses 508 and 510 may be positioned to correspond to eyes of a user. The user may view a screen on a display through lenses 508 and 510. The display may be coupled or connected to electronic device 500. In some embodiments, the display may be included on (or in) cover 504 and cover 504 may be configured to couple to body 502A. In some embodiments, electronic device 500B may include a display, such as display 150A or 150B described above in reference to FIG. 4. Thus, cover 504 may be communicatively coupled to body 502A (e.g., to couple a display of cover 504 to a processor of electronic device 500) and mechanically coupled (e.g., attached to) body 502. In some embodiments, the communicative coupling between body 502A and cover 504 may be wired and/or wireless.

In some embodiments, control device 514 may be located on a side surface of body 502A. Control device 514 may be used for the user to enter an input for controlling the head-mounted electronic device 500A. For example, control device 514 may include a touch panel, a button, a wheel key, and/or a touch pad. The touch panel may receive the user's touch input. The touch input may be a direct touch input to the touch panel or a hovering input in the vicinity of the touch panel.

Figure 5B:
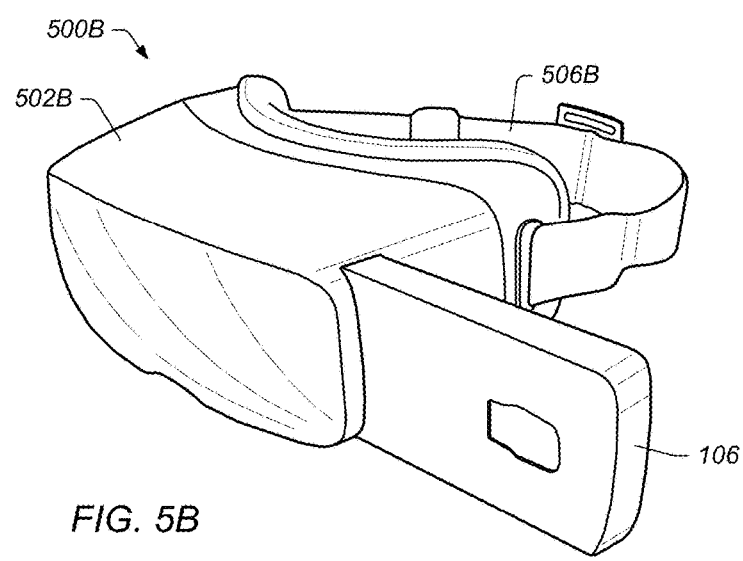

Turning to FIG. 5B, a head-mounted electronic device 500B may include a body 502B and a support 506B. Body 502B may be configured to couple to a wireless station and a display of electronic device 500B may be a display of a wireless station, such as wireless station 106, and the wireless station may be coupled or connected to (e.g., may be detachably mounted to) electronic device 500B. In other words, electronic device 500B may be configured such that a wireless station may be non-permanently coupled to, and removable without destructive measures, to electronic device 500B. Thus, electronic device 500B may be coupled to and decoupled from (e.g., non-destructively decoupled from) a wireless station without a change in functionality of the wireless station or electronic device 500B.

Figure 5C:
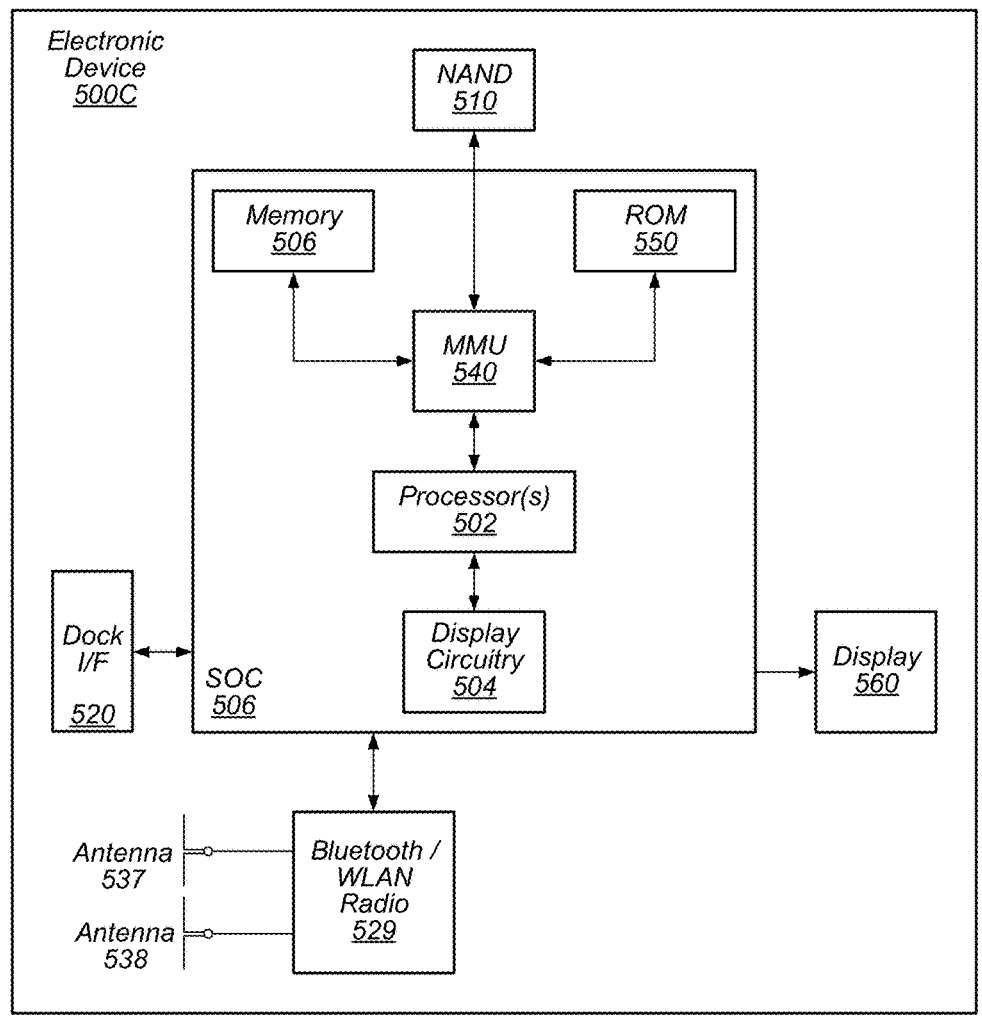
FIG. 5C illustrates an example block diagram of a head-mounted stereoscopic display system configured according to some embodiments.

Turning to FIG. 5C, FIG. 5C illustrates an example simplified block diagram of a head-mounted electronic device 500C. According to embodiments, electronic device 500C may be include a display (e.g., such as electronic device 500A) or may be configured to couple to wireless station (e.g., such as electronic device 500B). Note that electronic devices 500A and 500B described above may include at least portions of the features described in reference to electronic device 500C.

As shown, the electronic device 500C may include a system on chip (SOC) 506, which may include portions for various purposes. The SOC 506 may be coupled to various other circuits of the electronic device 500C. For example, the electronic device 500C may include various types of memory (e.g., including NAND flash 510), a connector interface (I/F) (or dock) 520 (e.g., for coupling to a computer system, dock, charging station, external display, etc.), the display 560 (note that is some embodiments, electronic device 500C may not include display 560), and short to medium range wireless communication circuitry 529 (e.g., Bluetooth™ and WLAN circuitry). The short to medium range wireless communication circuitry 529 may also couple to one or more antennas, such as antennas 537 and 538 as shown. The short to medium range wireless communication circuitry 529 may include multiple receive chains and/or multiple transmit chains for receiving and/or transmitting multiple spatial streams, such as in a multiple-input multiple output (MIMO) configuration.

As shown, the SOC 506 may include processor(s) 502, which may execute program instructions for the electronic device 500C and display circuitry 504, which may perform graphics processing and provide display signals to the display 560 (and/or to dock 520). The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, short range wireless communication circuitry 529, connector interface (I/F) 520, and/or display 560. The MMU 540 may be configured to perform memory protection and page table translation or set up. In some embodiments, the MMU 540 may be included as a portion of the processor(s) 502.

In some embodiments, electronic device 500C (and/or an electronic device such as electronic device 500A or 500B) may be in communication with a user input device, such as user input device 130 described above. In some embodiments, the electronic device may receive user input via user input device 130 as described above.

In addition, in some embodiments, electronic device 500C may include one or more positional sensors such as accelerometers, gyroscopic sensors, geomagnetic sensors, magnetic sensors, proximity sensors, gesture sensors, grip sensors, and/or biometric sensors. In some embodiments, the electronic device may acquire information for determining a motion of a user wearing the electronic device and/or whether a user wears or removes electronic device 500C, using the one or more positional sensors. The at least one processor may control execution of a function(s) or an operation(s) corresponding to an input received through a control device (for example, control device 514 and/or user input device 130) in response to a received input.

As described herein, the electronic device 500C may include hardware and software components for implementing the features described herein, e.g., the electronic device 500C may form at least part of a display system (e.g., a 3D display system) such as system 100 described above and/or systems 500A and 5B described below. For example, the processor 502 of the electronic device 500C may be configured to implement part or all of the features described herein, e.g., by executing program instructions stored on a memory medium (e.g., a non-transitory computer-readable memory medium). Alternatively (or in addition), processor 502 may be configured as a programmable hardware element, such as an FPGA (Field Programmable Gate Array), or as an ASIC (Application Specific Integrated Circuit). Alternatively (or in addition) the processor 502 of the UE 106, in conjunction with one or more of the other components 500, 504, 506, 510, 520, 535, 550, 560 may be configured to implement part or all of the features described herein.

In addition, as described herein, processor 502 may include one or more processing elements. Thus, processor 502 may include one or more integrated circuits (ICs) that are configured to perform the functions of processor 502. In addition, each integrated circuit may include circuitry (e.g., first circuitry, second circuitry, etc.) configured to perform the functions of processor(s) 502.

Figure 6:
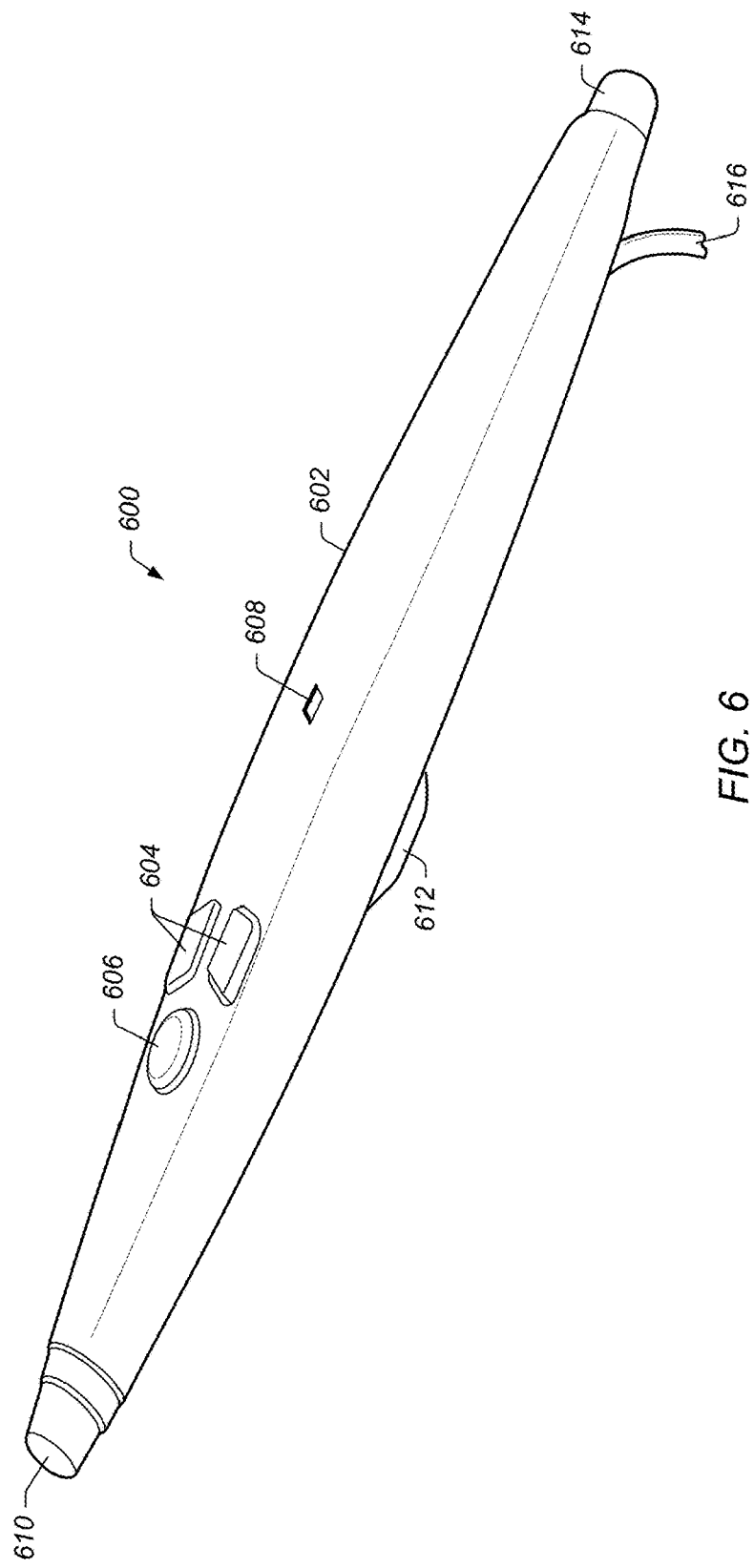
FIG. 6 illustrates an example of a user input device, according to some embodiments.

FIG. 6 illustrates an example of a user input device, according to some embodiments. As shown, a user input device 600 may be configured to perform various embodiments as described herein. User input device 600 may be similar to or the same as user input device 130 as described above in reference to FIGS. 4 and 5B-5C. Thus, user input device 600 may be used in conjunction with, or be included in, system 100 or systems 500 and 550. As described above, systems 100, 500, and 550 may have the capability to determine the six axis position and orientation of user input device 600. Note that this includes the X, Y, Z location of tip 610 of user input device 600 and the $\alpha$, $\beta$, $\gamma$ angular orientation of body 602 of user input device 600. However, it should be further noted that user input device 600 is exemplary, and that other user input devices, suitably configured, may be used as desired.

As shown, user input device 600 may include buttons 604, 606, and 612. One of the buttons, such as button 606, may be depressed and held down to trigger the selection of an object within a 3D scene presented by any of systems 100, 500, and 550. Additionally, system 100 may be configured to display a virtual "laser like" projection from tip 610 to the selected object. With the object selected, adjustment of the position and/or orientation of user input device 600 may change the position and/or orientation of the object. Thus, movements of the user input device 600 may result in corresponding translations and/or rotations of the object.

Transmitting and Receiving Optical Data

Figure 7:
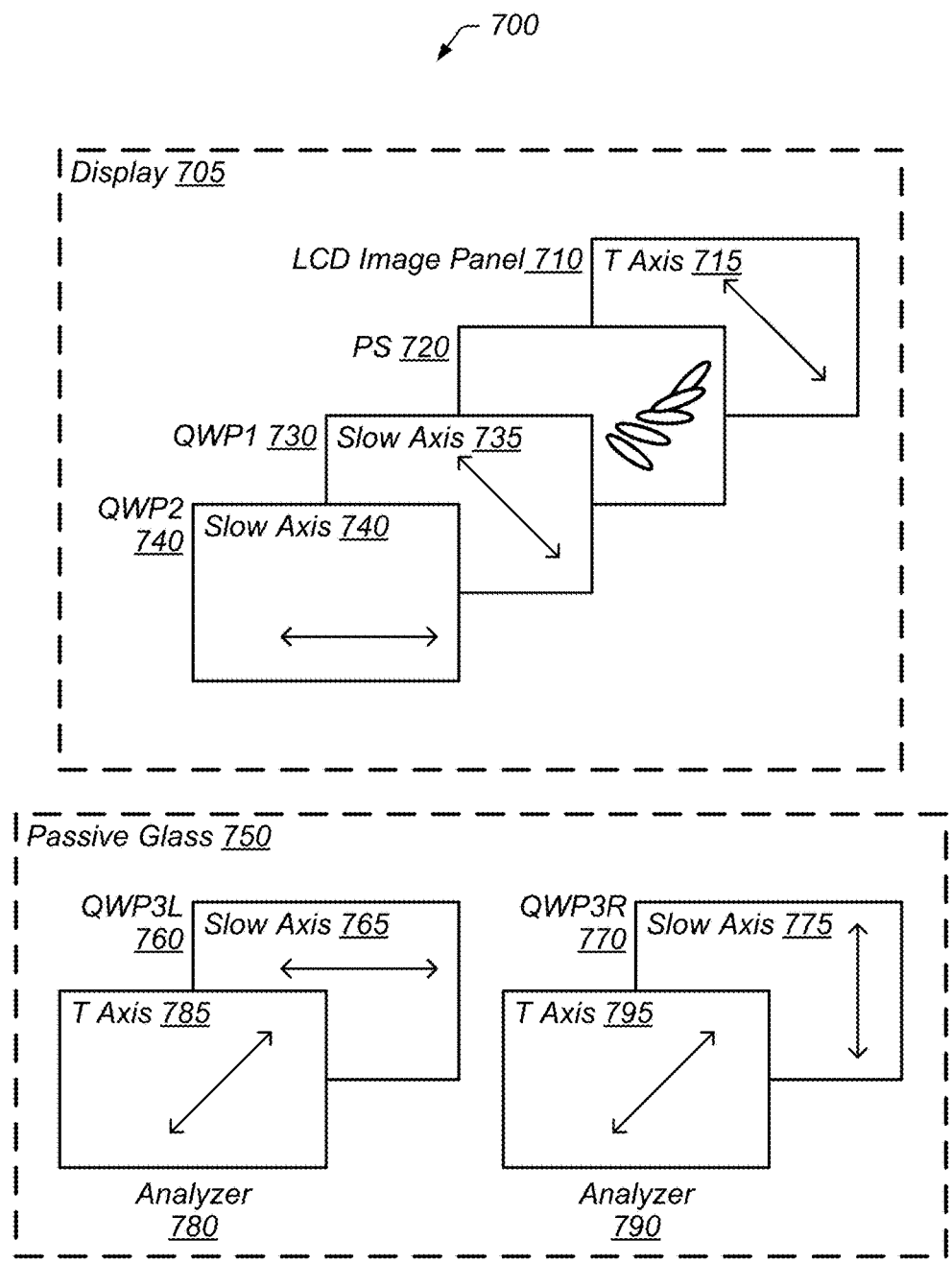
FIGS. 7 and 8 are block diagrams illustrating examples of optical systems for transmitting and receiving optical data, according to existing implementations.
Figure 8:
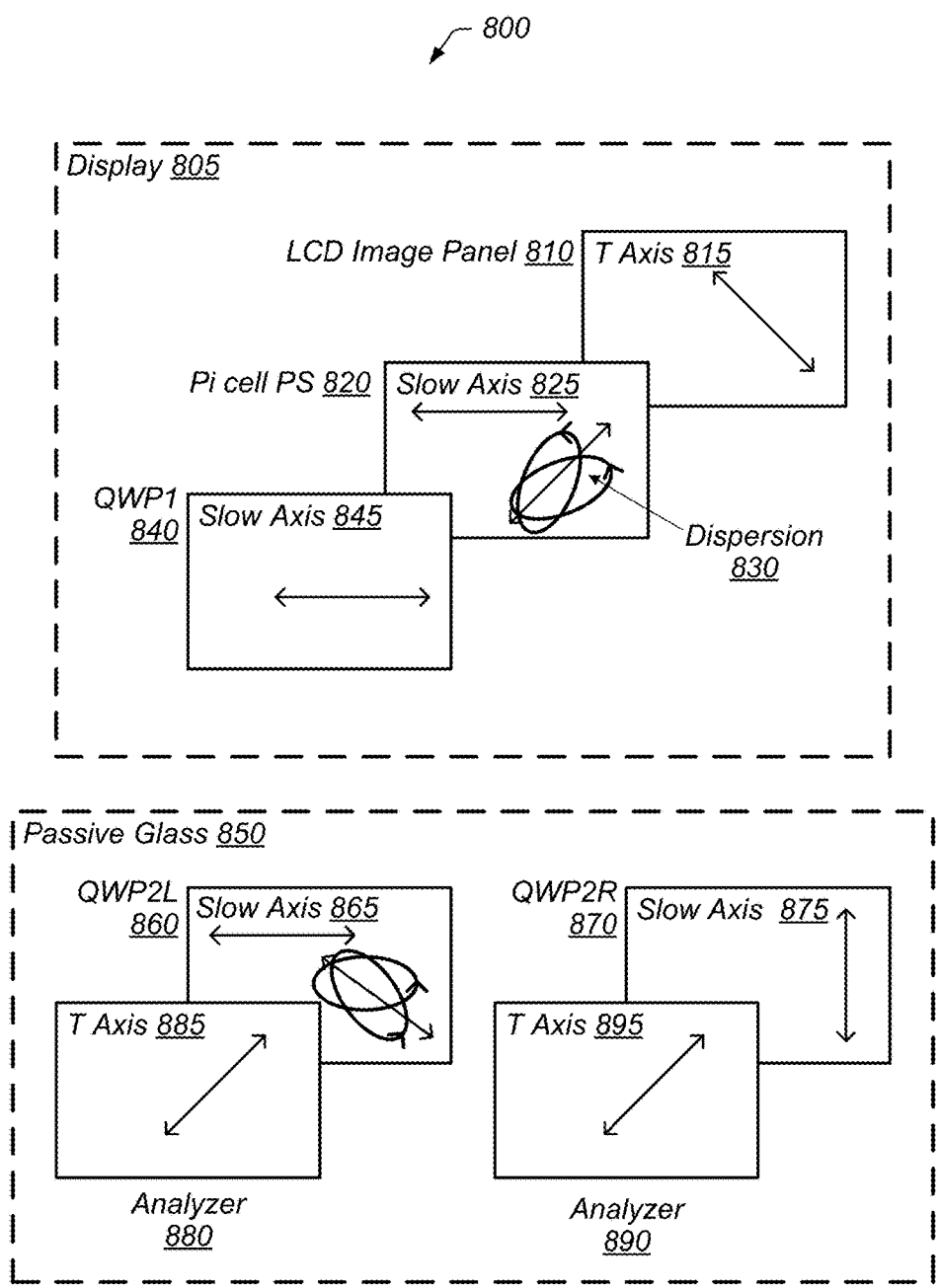

FIGS. 7 and 8 illustrate block diagrams of existing implementations of systems for transmitting and receiving optical data. In existing implementations, a twisted nematic (TN) type device may be implemented as a polarization switch. For example, as illustrated by FIG. 7, system 700 includes display 705 and passive glass 750. Display 705 includes LCD image panel 710 which displays image data with a linear polarization in the direction of T Axis 715, polarization switch (PS) 720, QWP1 730 which polarizes in the direction of Slow Axis 735, and QWP2 740, which polarizes in the direction of slow axis 740. Passive glass 750 includes QWP3L and QWP3R which polarize in the direction of Slow Axes 765 and 775 respectively, and analyzers 780 and 790, which polarize in the direction of T Axes 785 and 795 respectively.

PS 720 may be a twisted nematic (TN) type device in the illustrated implementation. A TN device may rotate the polarization of incoming light according to one voltage applied to the device or the TN device may allow light to pass through un-rotated according to another voltage. Switching may occur for partial rotations; for example transitions may proceed from 10% of a 90 degree rotation state to 90% of a 90 degree rotation state. Changing states of the TN device may require some amount of time. Switching from a 10% rotation state to a 90% rotation state may take 1 ms while switching from a 90% rotation state to a 10% rotation state may take 4-6 ms. Switching between lower and higher percentage states may take longer, for example switching from a 99% rotation state to a 1% rotation state may take longer than 8 ms. Other TN devices may have other lengths of time. In the illustrated implementation, the length of time required to transition from one state to the other may be long enough to overlap with the timing required for the video display. For example, video transmitted at 120 Hertz requires approximately 8 ms for each frame. When the switching time of the TN device approaches or exceeds 8 ms, images intended for one receiving device may be transmitted to another, for example images in a 3D system intended for a left eye may be received at least partially by the right eye. This kind of interference may be called "ghosting".

As another example, FIG. 8 illustrates a block diagram of an implementation of system 800 for transmitting and receiving optical data. Similarly to FIG. 7, FIG. 8 illustrates a display and a passive glass section, each with a set of optical elements including (but not limited to) LCD image panel 810, multiple quarter wave plates, analyzers, and a PS. Many elements of the illustrated implementation are similar to those described in FIG. 7.

In the illustrated implementation, the PS may be Pi-cell PS 820. In the illustrated implementation, Pi-cell PS 820 may be in a low voltage state. Pi-cell PS 820 may result in dispersion 830 affecting the transmitted light. In the low voltage state of Pi-cell PS 820, green light may be transformed to linear polarization orthogonal to T axis 815. Due to dispersion 830, the polarization state of red and blue light may not be transformed to linear polarization orthogonal to T axis 815, and may instead be transmitted as elliptically polarized light. In some embodiments, the two ellipsis of dispersion 830 illustrate a possible polarization state of red and blue light. In some embodiments, the dispersion may be a continuous function of frequency; specific frequencies (e.g. red, green, blue) have been discussed as non-limiting examples.

Passive glass 850 may be similar to passive glass 750. Both implementations include a left and right side, as well as quarter wave plates QWP2L 860 and QWP2R 870 with slow axis 865 and slow axis 875 respectively, and analyzers 880 and 890 with T axis 885 and 895 respectively. In some embodiments, these elements have similar properties as described in FIG. 8 and with respect to displaying optical data for 3D displays.

Slow Axis 865 illustrates ellipses in addition to the direction of the axis. In some embodiments, these relate the direction of the polarization of the transmitted light in a similar manner as discussed with respect to dispersion 830. Dispersion 830 may affect the light that is transmitted from display 805 to passive glass 850 and received by a user after analyzer 880 or 890. In the illustrated implementation, dispersion may cause some light to be viewed through a side that may not allow light to be seen; for example, when the polarization state of Pi-cell PS 820 corresponds to transmitting a right-eye image, dispersion may result in red or blue portions of the right-eye image being transmitted through the left side. This may result in distortion of the 3D video. This distortion may occur for either left or right sides, corresponding to either polarization state of Pi-cell PS 820.

Embodiments described herein include systems and methods for an optical design to use a Pi-cell as a polarization switcher in a three dimensional (3D) display system. In some embodiments, Pi-cells may be included as polarization switchers for transmitting optical data, including but not limited to 3D display data. In some embodiments of 3D video, transmission may include a device for switching the polarization of a video source. In some embodiments, the rate of switching of the polarization switcher may introduce a distortion to the 3D image. A Pi-cell device may be used in some embodiments to reduce distortion based on switching speed. In some embodiments, polarization switchers may introduce a distortion based on the frequency of transmitted light. In some embodiments, optical elements, for example quarter wave plates, half wave plates, etc., may be configured to reduce distortions based on frequency.

Various embodiments are presented of systems/methods for an optical design to use a Pi-cell as a polarization switcher in a three dimensional (3D) display system. In some embodiments, Pi-cells may be included as polarization switchers for transmitting optical data, including but not limited to 3D display data. Note that the various embodiments described herein may be combined (or included) in any of the above described systems and devices, among other systems and devices.

Figure 9A:
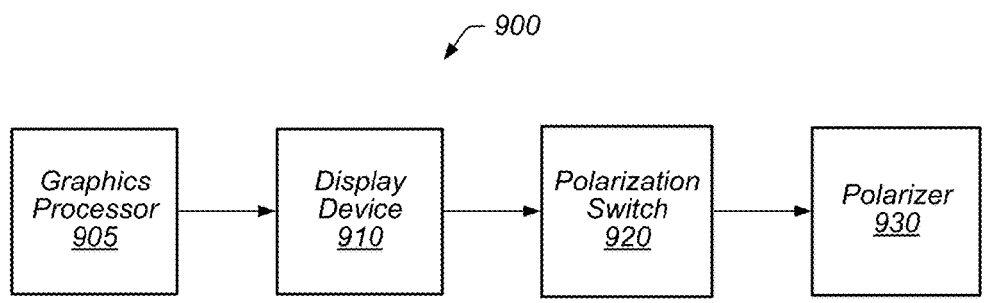
FIG. 9A is a block diagram illustrating an example of a system for transmitting optical data, according to some embodiments.

For example, FIG. 9A illustrates a block diagram of an example of a system 900 for transmitting optical data, according to some embodiments. In some embodiments, data may be 3D video data, optical display data, data encoded via light, non-graphical data, and/or other kinds of data. In some embodiments, graphics processor 905 may process graphical data to a format corresponding to three dimensional (3D) video display. Graphics processor 905 may include mechanisms (e.g., circuitry) for generating left and right video streams from 3D video data and interleaving frames designated for alternating eyes. In some embodiments, processing data may include increasing the number of images to increase the frame rate, processing images based on related 3D data, and/or other processing steps required to generate 3D video.

Graphics processor 905 may transmit data to display device 910. In some embodiments, graphics processor 905 may be included in the same device as display device 910, or graphics processor 905 may be a standalone device. In other embodiments, graphics processor 905 may be a component in a general computing device.

Display device 910 may receive data to be displayed from graphics processor 905 or another source of data. In some embodiments, display device 910 may be a liquid crystal display (LCD), though in other embodiments display device 910 may be a different kind of display device. In some embodiments, display device 910 may display information using light which may be linearly polarized; display device 910 may or may not include components to polarize emitted light. In some embodiments, display device 910 may emit light that is linearly polarized, circularly polarized, elliptically polarized, unpolarized, and/or any combination of polarizations.

Polarization switch 920 may be an optical element configured to receive light emitted by display device 910. In some embodiments, polarization switch 920 may be included in display device 910 or may be attached to display device 910. In other embodiments, polarization switch 920 may be placed in front of display device 910 or in another position relative to display device 910. In some embodiments, polarization switch 920 may be controlled electronically to alter the polarization of the light emitted by display device 910. In some embodiments, a Pi-cell device may be included in polarization switch 920; in other embodiments, twisted nematic (TN) devices may be used. In some embodiments, a Pi-cell may be a type of liquid crystal device that rotates the polarization of transmitted light by 90 degrees in response to an applied electronic voltage. In some embodiments, polarization switch 920 may require a single high voltage, a single low voltage, a high and a low voltage, and/or other forms of electronic stimulation.

In some embodiments, a Pi-cell may be a type of surface mode device. In some embodiments, a surface mode device may be a liquid crystal device which may include two plates and a material with the properties of a liquid crystal. In some embodiments, a surface mode device may be configured to operate with a low voltage input and/or a high voltage input; a low voltage input may maintain the bulk of the liquid crystal material in one orientation while liquid crystal material relatively close to the plates may be maintained in another orientation by interactions with the surface of the plates. In some embodiments, a high voltage input may align the surface liquid crystal material and the bulk liquid crystal material in one orientation. In some embodiments, aligning only the liquid crystal material in proximity to the surface may result in relatively fast switching between states.

The characteristics of polarization switch 920 may be altered by a state of polarization switch 920. As an example, when the applied voltage is changed from one state to another state (e.g., from a first state to a second state), polarization switch 920 may alter the polarization of transmitted light, and/or may transmit less light overall. In some embodiments, the transmittance may be different for different frequencies of transmitted light. As a non-limiting example, green light may be perfectly transmitted while red light may only be partially transmitted. In some embodiments, the shift of the polarization may be different for different frequencies of light. This effect may be referred to as dispersion. In some embodiments, dispersion relates to any frequency based difference in the properties of an optical element. As a non-limiting example, green light may be rotated 90 degrees, while red light may only be rotated 80 degrees. In some embodiments, one state of polarization switch 920, for example having a high voltage applied (e.g., a first state), may result in polarization rotations that are approximately equal for all frequencies of light, while another state of polarization switch 920, such as having a low voltage applied (e.g., a second state), may results in polarization rotations that vary with frequency of light.

In some embodiments, the speed at which polarization switch 920 can change states may be limited. For example, some TN devices may not switch polarization states at a rate which may allow for optimal transmission of 3D video data. Switching states too slow may result in distortion of the 3D video by partially transmitting some images in an incorrect polarization state. In some embodiments, polarization switch 920 may be configured to switch at a speed fast enough to reduce distortion. For example, 3D video may be transmitted at 120 frames per second (e.g. 60 frames per second for each of left and right channels), and polarization switch may be configured to switch at a faster rate. In some embodiments, Pi-cell devices may switch at faster speeds than TN devices.

Polarizer 930 may receive light transmitted by polarization switch 920. In some embodiments, polarizer 930 may be a quarter wave plate. In such embodiments, transmitted light may be transformed from linearly polarized light to circularly polarized light. In some embodiments, polarizer 930 may include multiple components or may be a single device. In some embodiments, polarizer 930 may be a sheet of material. In some embodiments, polarizer 930 may be, as an example not intended to be limiting, in a range of 0.020 inches thick to 0.030 inches thick. Polarizer 930 may be other thicknesses, both larger and smaller, in some embodiments.

Figure 9B:
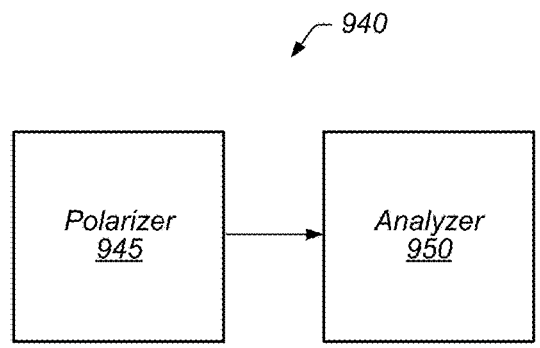
FIG. 9B is a block diagram illustrating an example of a system for receiving optical data, according to some embodiments.

As another example, FIG. 9B illustrates a block diagram of an example of a system 940 for receiving optical data, according to some embodiments. In some embodiments, data may be 3D video data, optical display data, data encoded via light, non-graphical data, and/or other kinds of data. In some embodiments, system 940 may be configured to receive display data from system 900. In some embodiments, the optical display data being received may correspond to a 3D display. For example, the display data may be interleaved frames of video, where alternating frames may be transmitted with orthogonal polarization states. In some embodiments, a device for receiving the optical display data may be a set of eyewear configured to cover at least two eyes. As a non-limiting example, glasses may be used. In this example, system 940 would be included for each lens of a pair of glasses, e.g. once for the left (e.g., left lens) and once for the right (e.g., right lens). In some embodiments, properties of polarizer 945 and analyzer 950 may be different for the left and right lenses. In some embodiments, only a single instance of system 940 may be used, or more than two instances of system 940 may be used. In general, any number of polarizers 945 and analyzers 950 may be used.

In some embodiments, light transmitted from system 900 may be circularly or elliptically polarized, and the light received by system 940 may be circularly or elliptically polarized.

Polarizer 945 may be a quarter wave plate in some embodiments. In some embodiments, polarizer 930 may transmit circularly polarized light, so polarizer 945 may be chosen such that the linear polarization state from before polarizer 930 may be restored after polarizer 945. In some embodiments, polarizer 945 may be chosen so that the polarization state after polarizer 945 may be orthogonal to that prior to polarizer 930. Polarizer 945 may include multiple elements, including but not limited to quarter wave plates, half wave plates, pairs of quarter wave plates combined to form a half wave plate, linear polarizers, and/or other optical elements. In some embodiments, polarizer 945 may be passive, e.g. it may not require external energy input, but in some embodiments polarizer 945 may require energy input of some kind, e.g. electrical, optical, etc.

In some embodiments, polarizer 945 may affect the polarization of light of all frequencies equally. In other embodiments, different frequencies of light may be altered differently; for example, in an embodiment where polarizer 945 may be a quarter wave plate, green light may be delayed by a quarter wavelength along the slow axis while red light may be delayed by more than a quarter wavelength in the slow axis. As discussed previously, frequency based differences in the properties of an optical element may be referred to as dispersion. In some embodiments, polarizer 945 may be configured such that the dispersion effects of polarizer 930 may be at least partially canceled by the dispersion effects of polarizer 945. In some embodiments, polarizer 945 may include multiple elements which may contribute to substantially cancelling dispersion effects.

In some embodiments, analyzer 950 may selectively substantially block a subset of the display data. In an embodiment where the display data includes 3D video information where alternating frames of video have orthogonal polarization, analyzer 950 may substantially block half of the frames corresponding to one side of the video display. For example, eyewear may include two instances of system 940; on the left side analyzer 950 may be configured to substantially block images corresponding to the right eye, while the right side analyzer 950 may be configured to substantially block images corresponding to the left eye. In such an embodiment, alternating images would be presented to the wearer which may create the illusion of 3D video.

In some embodiments, analyzer 950 may be a linear polarizer. In such embodiments, polarizer 945 may have converted incoming circularly polarized light into linearly polarized light, where the polarization may be in a particular direction. Analyzer 950 may then substantially block light where the direction of polarization may be orthogonal to the direction of the linear polarizer, in some embodiments. In some embodiments, analyzer 950 may include more than one optical element, some examples of which may be linear polarizers, quarter wave plates, magnifying lenses, and/or other elements used for optical paths.

In embodiments where two instances of system 940 are used, analyzer 950 may be the same or different from one instance to another. For example, in the eyewear discussed previously, analyzer 950 may be identical on the left and right sides (e.g., for a left lens system and a right lens system). In other embodiments of eyewear, analyzer 950 could be different between the left and right sides (e.g., lens systems). For example, in an embodiment where analyzer 950 includes a linear polarizer, the orientation of the linear polarizer may be the same on both sides, or the orientations may be orthogonal.

Some embodiments of systems 900 and 940 may include optical communication systems. Some embodiments may include only a single instance of system 940. As an example, light may be transmitted by system 900 through a fiber optic medium to a receiver such as system 940. In some embodiments, data may include internet protocol data, telephonic data, or other types of data which may be encoded in optical systems. Media other than fiber optics, e.g. free space, may be used in some embodiments. The specific embodiments described herein, e.g. 3D display, optical data transmission, etc., are not intended to be limiting.

Figure 10:
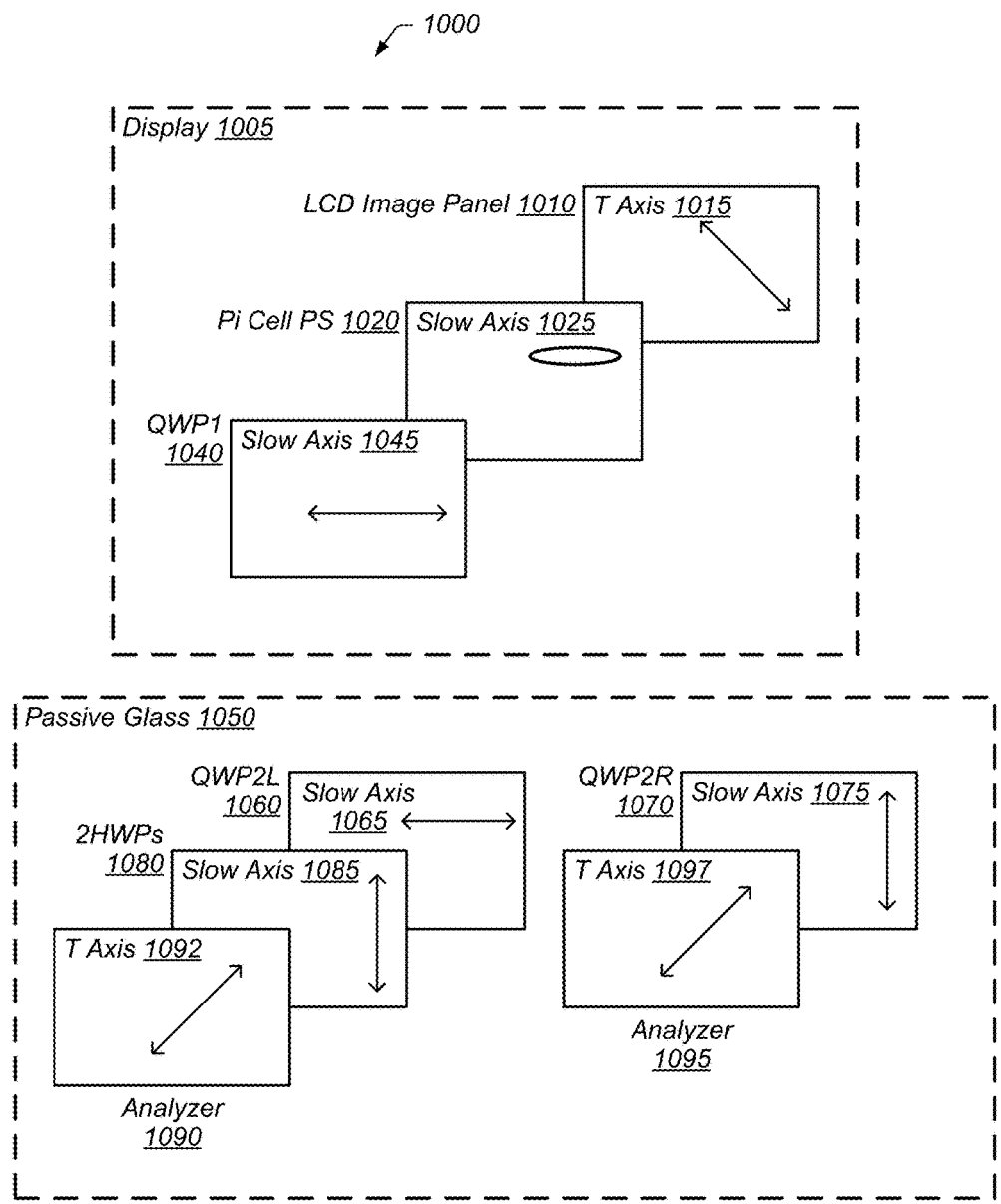
FIGS. 10 and 11 are block diagrams illustrating examples of systems for transmitting and receiving optical data, according to some embodiments.

FIG. 10 illustrates a block diagram of an example of a system 1000 for transmitting and receiving optical data, according to some embodiments. In some embodiments, as shown, display 1005 may include a liquid crystal display (LCD) image panel 1010. LCD image panel 1010 may be a source of image information, in some embodiments. Typical video sources, including but not limited to digital video disk (DVD), streaming internet sources, and/or high-definition multimedia interface (HDMI) output from a computer, may connect to LCD image panel 1010 and provide images for display. In some embodiments, 3D image data may require more frames per second than traditional 2D videos. For example, 3D image data may require up to 120 images per second. Other image frequencies may also be required, either more or fewer.

In some embodiments, LCD image panel 1010 may emit light which may be linearly polarized. The direction of polarization, in some embodiments, may be in the direction indicated by T Axis 1015. In other embodiments, the light from LCD image panel 1010 may be polarized in other directions, it may be unpolarized, and/or it may be circularly polarized, etc.

Pi-cell PS 1020 may be a polarization switch (PS) in some embodiments. Polarization switch 1020 may be an optical element configured to receive light emitted by LCD image panel 1010. In some embodiments, polarization switch 1020 may be included in LCD image panel 1010 or may be attached to LCD image panel 1010. In other embodiments, polarization switch 1020 may be placed in front of LCD image panel 1010 or in another position relative to display device 1010. In some embodiments, polarization switch 1020 may be controlled electronically to alter the polarization of the light emitted by LCD image panel 1010.

A PS may rotate the polarization of incoming light according to one voltage applied to the device or the PS device may allow light to pass through un-rotated according to another voltage. In some embodiments, a low voltage state rotates and a high voltage state may not. Changing states of the PS device may require some amount of time. In some embodiments, changing from a non-rotating state to a rotating state may be faster than changing from a rotating state to a non-rotating state. In other embodiments, changing from a non-rotating state to a rotating state may be slower than or take the same amount of time as changing from a rotating state to a non-rotating state.

In some embodiments, a Pi-cell may be a liquid crystal device which may rotate the polarization of light according to an electronic signal. The electronic signal may be a voltage applied across the device; for example, a high voltage applied to the device may switch the device to a state where an optical signal may be rotated in polarization while a low or negative voltage signal may switch the device to a state where an optical signal may not be rotated. Pi-cells, in some embodiments, may respond to changes in the electrical signal more rapidly than TN devices. For example, switching from low to high may require 50 micro seconds, while switch from high to low may take 1 ms, in some embodiments. In some embodiments, switching from low to high may take 100 micro seconds, while switching from high to low may take less than 1 ms. In other embodiments, the amount of time required for switching may be shorter or faster, or switching from low to high or high to low may be equal.

In some embodiments, the direction of polarization in one state may be in the +45 degree direction to slow axis 1025, while the direction of polarization in the other state may be that of the incident light; in some embodiments that may be the direction of T Axis 1015. In some embodiments, Pi-cell PS 1020 may result in dispersion affecting the transmitted light. In some embodiments, in one state of Pi-cell PS 1020, green light may be transmitted to +45 degree direction relative to slow axis 1025 and the direction of the polarization state of the transmitted green light may be orthogonal to T axis 1015. Due to dispersion, red and blue light may not be transmitted linearly, and may instead be transmitted as elliptically polarized light with angles greater and less than that of +45 degree direction relative to slow axis 1025. In some embodiments, the dispersion may be a continuous function of frequency; specific frequencies (e.g. red, green, blue) have been discussed as non-limiting examples.

In some embodiments, Pi-cell PS 1020 may include a compensation film for high voltage state. This compensation film may alter the amount of dispersion, increasing or decreasing it, or it may alter some other property of the light from Pi-cell PS 1020. In some embodiments, Pi-cell PS 1020 may not include a compensation film, or it may include multiple films, both compensating and non-compensating, or other optical elements.

In some embodiments, Pi-cells may be approximately 1 mm thick, and may be comprised of glass plates, and may include a liquid crystal material of some kind. In other embodiments, Pi-cell may be thicker or thinner than this, and may include materials besides glass, such as plastic or other organic materials, ceramics, etc.

QWP1 1040 may be a quarter wave plate in some embodiments. In some embodiments, this may be a single optical element or in other embodiments it may be multiple optical elements. In some embodiments, QWP1 1040 may receive linearly polarized light and transmit circularly polarized light. In some embodiments, transmitted light may be elliptically polarized. Transmitted light may be polarized left- or right-handedly.

In some embodiments, passive glass 1050 may have left and right elements. In some embodiments, each element, left or right, includes a quarter wave plate and an analyzer. Light may be polarized circularly (or elliptically). As noted, circularly polarized light may include elliptically polarized light from display 1005 and received at passive glass 1050. QWP2L 1060 and QWP2R 1070 may receive the circularly polarized light and convert it to linearly polarized light. In some embodiments, the directions of QWP2L 1060 and QWP2R 1070 are orthogonal, as illustrated by the direction of slow axis 1065 and slow axis 1075. This may result in light transmitted by QWP2L 1060 and QWP2R 1070 being linearly polarized in orthogonal directions.

In some embodiments, light passing through QWP2L 1060 may be received by 2HWPs 1080. In some embodiments, 2HWPs 1080 may be comprised of two half-wave plates, which together may result in a full wave plate. Two half-wave plates, or a full wave plate, may result in a delay of a full wavelength in the direction of slow axis 1085, in some embodiments. In some embodiments, this would result in no change in the direction of polarization.

2HWPs 1080 may exhibit dispersion in some embodiments. In some embodiments, a particular frequency may experience no change in direction of polarization, while another may. For example, green light may be delayed by a full wavelength while red or blue light may be delayed by more or less, resulting in a change in the polarization of the red or blue light. In some embodiments, the dispersion may be a continuous function of frequency; specific frequencies (e.g. red, green, blue) have been discussed as non-limiting examples.

In some embodiments, the dispersion characteristics of 2HWPs 1080 may be chosen or configured such that the dispersion introduced by Pi-cell PS 1020 may be reduced or cancelled. For example, red light that may have a polarization angle relative to the green light may be rotated back by the same polarization angle. In some embodiments, this may result in better performance of the 3D video system. In embodiments where different images are alternately presented between left and right sides of passive glass 1050, dispersion may result in some light of different colors from the right images being displayed on the left or vice versa. In some embodiments, dispersion may be compensated for, reducing the light being transmitted through the wrong side, which may improve the quality of experience for the user.

In some embodiments, light from 2HWPs 1080 and QWP2R 1070 may be received by analyzer 1090 and analyzer 1095, respectively. The direction of the analyzers, show as T Axis 1092 and T Axis 1097, may be in the same direction in some embodiments. In some embodiments, the direction of T Axis 1092 or 1097 may indicate the direction of linearly polarized light that may pass through analyzer 1090 or analyzer 1095 without attenuation. Light orthogonal to the direction of T Axis 1092 or 1097 may be blocked completely or, in some embodiments, strongly attenuated.

In some embodiments, the light received by analyzers 1090 and 1095 may be linearly polarized in orthogonal directions, such that only one analyzer may transmit the light. In some embodiments, PS 1020 may rotate light by 90 degrees according to a voltage applied, which may result in a 90 degree shift in the rotation of light reaching analyzers 1090 and 1095. This shift may result in light being transmitted by the other side of passive glass 1050. For example, if at one state of PS 1020 light is being transmitted by analyzer 1090, when PS 1020 is switched to another state, light may be substantially blocked by analyzer 1090 and may be transmitted by analyzer 1095. Upon returning to the previous state, light may again be substantially blocked by analyzer 1095 and transmitted by analyzer 1090. In some embodiments, this switching may transmit a set of images to the left eye and right eye in an alternating pattern, which may create the illusion of 3D video to a viewer.

Figure 11:
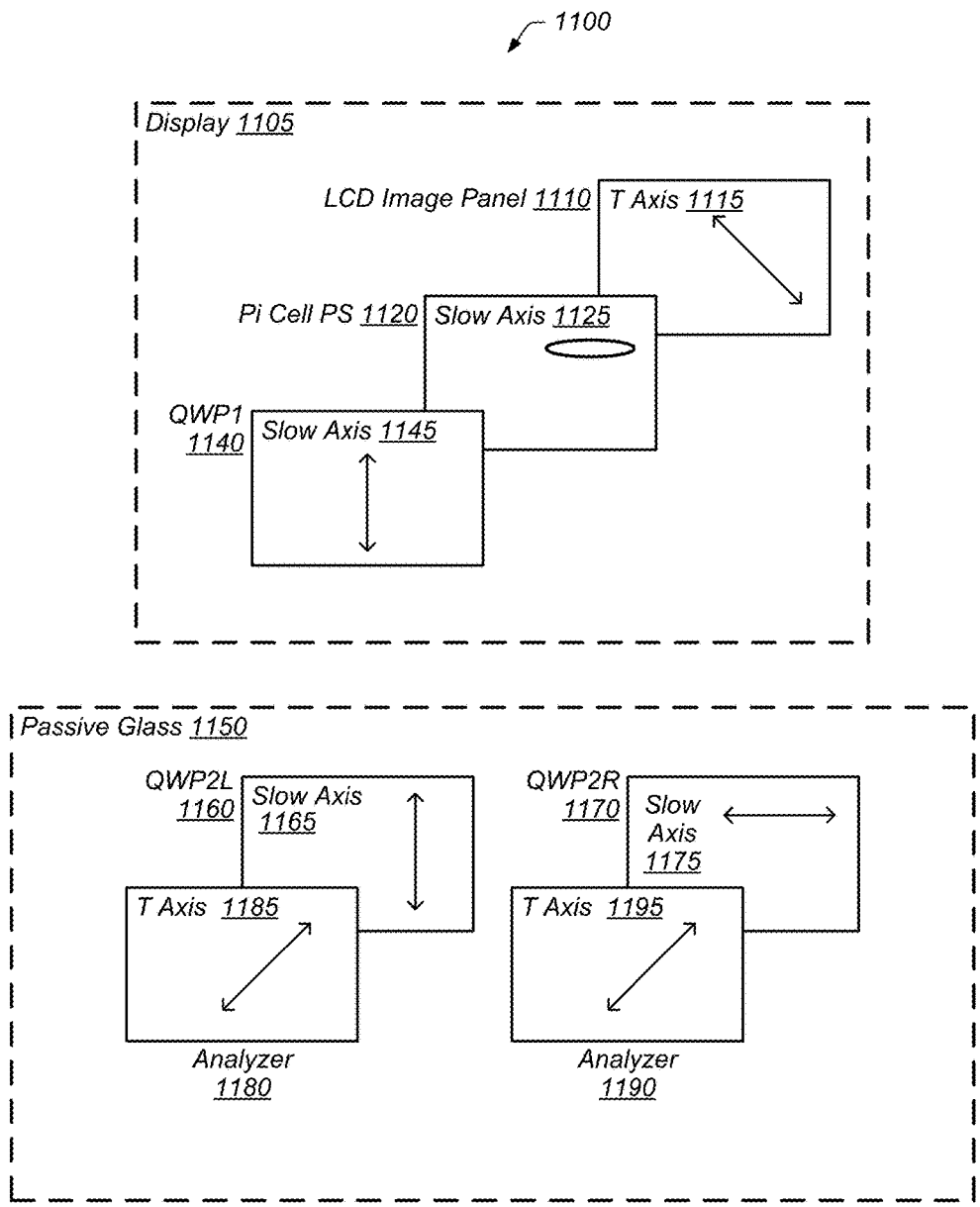

As another example, FIG. 11 illustrates a block diagram of a system for transmitting and receiving optical data, according to some embodiments. In some embodiments, as shown, display 1105 may include a liquid crystal display (LCD) image panel 1110. LCD image panel 110 may receive data to be displayed from a graphics processor or another source of data. In some embodiments, LCD image panel 110 may display information using light which may be linearly polarized; LCD image panel 110 may or may not include components to polarize emitted light. In some embodiments, LCD image panel 1100 may emit light that is linearly polarized, circularly polarized, elliptically polarized, unpolarized, and/or any combination of polarizations. LCD image panel 1110 may be a source of image information, in some embodiments. Typical video sources, including but not limited to digital video disk (DVD), streaming internet sources, and/or high-definition multimedia interface (HDMI) output from a computer, may connect to LCD image panel 1110 and provide images for display.

In some embodiments, LCD image panel 1110 may emit light which may be linearly polarized. The direction of polarization, in some embodiments, may be in the direction indicated by T Axis 1115. In other embodiments, the light from LCD image panel 1110 may be polarized in other directions, it may be unpolarized, and/or it may be circularly polarized, etc.

Pi-cell PS 1120 may be a polarization switch (PS) in some embodiments. Polarization switch 1120 may be an optical element configured to receive light emitted by LCD image panel 1110. In some embodiments, polarization switch 1120 may be included in LCD image panel 1110 or may be attached to LCD image panel 1110. In other embodiments, polarization switch 1120 may be placed in front of LCD image panel 1110 or in another position relative to display device 1110. In some embodiments, polarization switch 1120 may be controlled electronically to alter the polarization of the light emitted by LCD image panel 1110.

A PS may rotate the polarization of incoming light according to one voltage applied to the device or the PS device may allow light to pass through un-rotated according to another voltage. In some embodiments, a low voltage state rotates and a high voltage state may not. Changing states of the PS device may require some amount of time. In some embodiments, changing from a non-rotating state to a rotating state may be faster than changing from a rotating state to a non-rotating state. In other embodiments, changing from a non-rotating state to a rotating state may be slower than or take the same amount of time as changing from a rotating state to a non-rotating state.

In some embodiments, the direction of polarization in one state may be transformed to +45 degree direction relative to slow Axis 1125, while the direction of polarization in the other state may be that of the incident light; in some embodiments, that may be the direction of T Axis 1115. In some embodiments, Pi-cell PS 1120 may result in dispersion affecting the transmitted light. In some embodiments, in one state of Pi-cell PS 1120, green light may be transformed to +45 degree direction relative to slow axis 1125 with linear polarization orthogonal to T axis 1115. Due to dispersion, red and blue light may not be transmitted linearly, and may instead be transmitted as elliptically polarized light with angles greater and/or less than that of +45 degree direction relative to slow axis 1125. In some embodiments, the dispersion may be a continuous function of frequency; specific frequencies (e.g. red, green, blue) have been discussed as non-limiting examples.

In some embodiments, Pi-cell PS 1120 may include a compensation film for high voltage state. This compensation film may alter the amount of dispersion, increasing or decreasing it, or it may alter some other property of the light from Pi-cell PS 1120. In some embodiments, Pi-cell PS 1120 may not include a compensation film, or it may include multiple films, both compensating and non-compensating, or other optical elements.

QWP1 1140 may be a quarter wave plate in some embodiments. In some embodiments, this may be a single optical element or in other embodiments it may be multiple optical elements. In some embodiments, QWP1 1140 may receive linearly polarized light and transmit circularly polarized light. In some embodiments, transmitted light may be elliptically polarized. Transmitted light may be polarized left- or right-handedly.

In some embodiments, passive glass 1150 may have left and right elements. In some embodiments, each element, left or right, includes a quarter wave plate and an analyzer. Light may be polarized circularly (or elliptically). As noted, circularly polarized light may include elliptically polarized light from display 1105 and received at passive glass 1150. QWP2L 1160 and QWP2R 1170 may receive the circularly polarized light and convert it to linearly polarized light. In some embodiments, the directions of QWP2L 1160 and QWP2R 1170 are orthogonal, as illustrated by the direction of slow axis 1165 and slow axis 1175. This may result in light transmitted by QWP2L 1160 and QWP2R 1170 being linearly polarized in orthogonal directions.

Passive glass 1150 may include QWP2L 1160 and analyzer 1180 in some embodiments. In some embodiments, QWP2L may be chosen or configured in order to adjust the dispersion of the transmitted light, which, in some embodiments, may result in improved 3D video performance. In some embodiments, QWP2R 1170 may also be chosen or configured to compensate for dispersion. In some embodiments, dispersion introduced by QWP1 1140 may be compensated for by QWP2R 1170. In some embodiments, QWP2R may not result in any additional dispersion, or dispersion correction may not be necessary for the right side of passive glass 1150.

In some embodiments, the directions of slow axis 1125, slow axis 1145, slow axis 1165, and slow axis 1175 may be rotated 90 degrees with respect to the axes of corresponding parts of system 1000. In some embodiments, the direction of Pi-cell Ps 1120 may be the same as Pi-cell PS 1020; in the embodiment described, where slow axis 1125, 1145, 1165, and 1175 are rotated, this may alter the resulting dispersion from Pi-cell PS 1120. In some embodiments, the rotations may result in dispersion affecting the left and right sides differently compared to ystem 1000.

Figure 12:
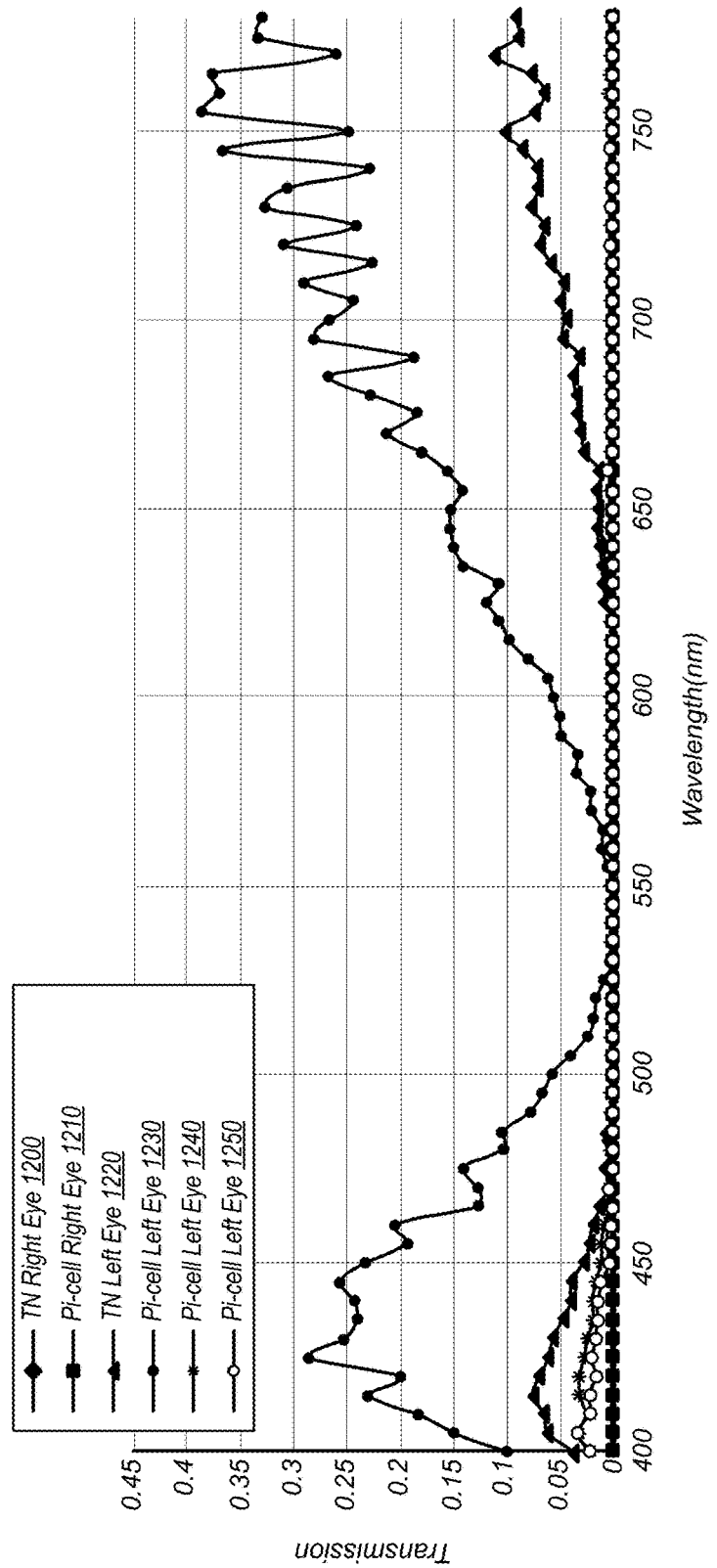
FIG. 12 is a graph illustrating the transmission of light versus wavelength, according to some embodiments.

FIG. 12 illustrates a graph of transmission of light versus wavelength for various systems. The illustrated curves correspond to left or right side of passive glass from simulated systems corresponding to existing implementations 700 and 800 and systems 1000 and 1100, where left eye and right eye correspond to left side and right side respectively. The curves TN right eye 1200 and TN left eye 1220 correspond to system 700; some implementations of system 700 include a Twisted Nematic (TN) device as a PS. Curve Pi-cell right eye 1210 corresponds to the right eye of system 800, 1000, and 1100. Curve Pi-cell left eye 1230 corresponds to the left side of system 800, curve Pi-cell left eye 1240 corresponds to the left side of system 1000, and curve Pi-cell left eye 1250 corresponds to the left side of system 1100.

In some embodiments, both curves TN right eye 1200 and Pi-cell right eye 1210 show very little transmission across the wavelengths depicted. Systems 700, 800, 1000, and 1100 may direct light to the right eye when the PS device may be in a state which corresponds to little or no dispersion. In other embodiments, the right eye may receive light from other states of the PS device, or some PS devices may result in dispersion effects in all polarization states.

In some embodiments, the curve TN left eye 1220 may display a level of transmission at low and high wavelengths. The TN device may result in some dispersion, which may result in transmission at lower and higher frequencies.

In some embodiments, the curve Pi-cell left eye 1230 may display a large level of transmission. In some embodiments, this may be a result of a higher level of dispersion resulting from Pi-cell devices. In some embodiments, TN cell devices may switch more slowly than Pi-cell devices, but may exhibit lower dispersion, e.g., as illustrated in FIG. 12. The high levels of transmission at low and high wavelengths from system 900 may result in lower quality of optical data or 3D display for a user.

In some embodiments, the curves Pi-cell left eye 1240 and Pi-cell left eye 1250 display the lowest transmission for left eye curves across all wavelengths. In some embodiments of systems 1000 and 1100, optical elements may be chosen to reduce or modify dispersion, which may result in lower levels of transmission at the lower and higher frequencies of light, as shown in some embodiments. In some embodiments, systems 1000 and 1100 may result in less dispersion than system 800 (TN devices) which may result in improved user experience. Faster switching of a PS Cell, in combination with decreased dispersion may result in fewer distortions, e.g. ghosting or dispersion effects, which may result in improved optical data transmission of 3D video/images, in some embodiments.

Figure 13A:
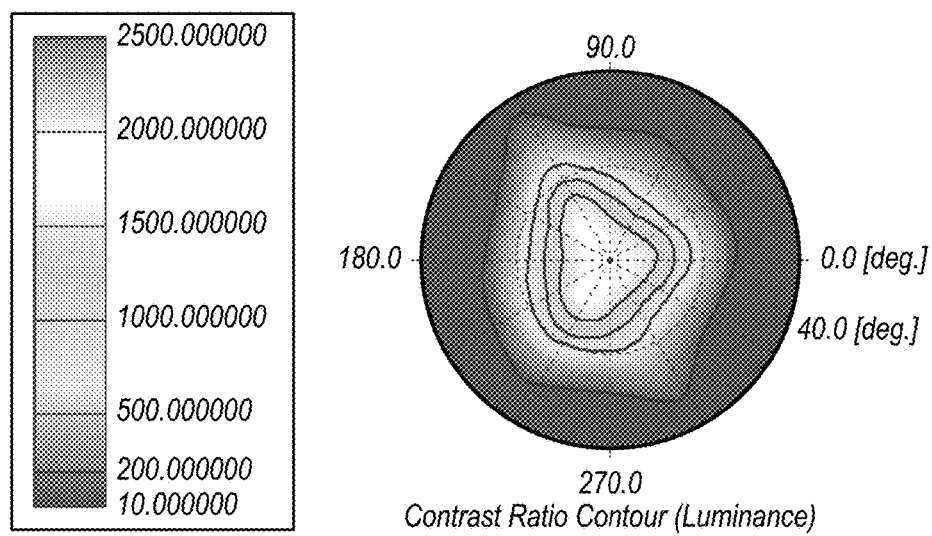
FIGS. 13A-C and 14A-C are diagrams illustrating viewing angles of optical systems, according to some embodiments.
Figure 13B:
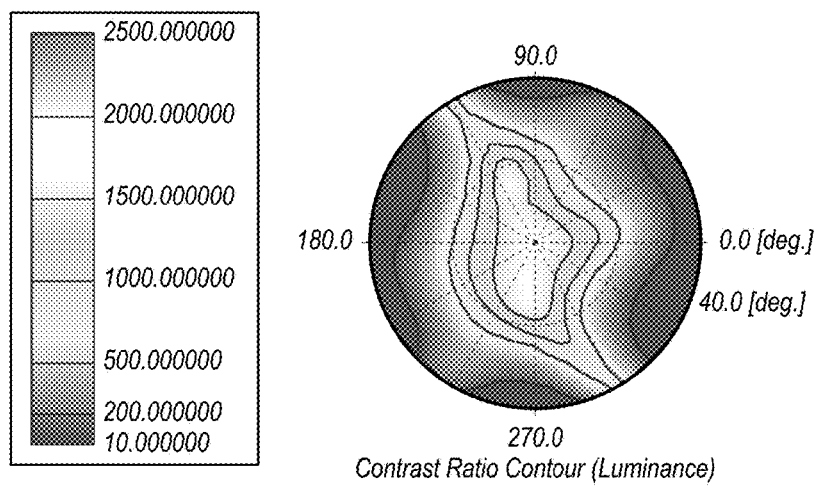
Figure 13C:
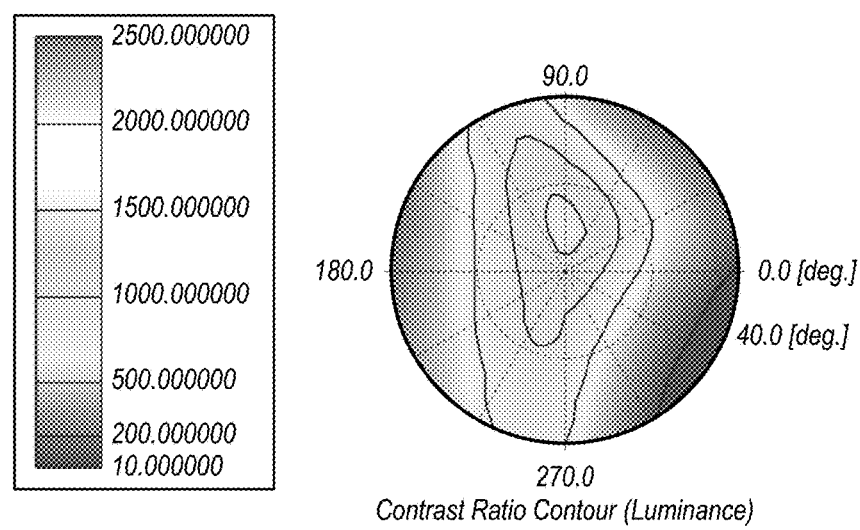

FIGS. 13A, 13B, and 13C illustrate a viewing angle diagram. Viewing angles for the left eye of systems 800, 1000, and 1100 are shown and depicted by a pattern of Luminance or Contrast Ratio Contour (CRC) displayed in polar coordinates (e.g. based on a distance and angle from a center point). In some embodiments, the CRC can range from 10 to 2500 units, and may be greatest towards the center of the depiction.

FIG. 13A displays a generally symmetric distribution that has a maximum between approximately 1500 and 2000. In some embodiments, FIG. 13B displays a distribution with a similar range but a slightly different shape. FIG. 13B may have extended areas of relatively higher CRC around 120 and 240 degrees, in some embodiments.

FIG. 13C displays a distribution that may be substantially less symmetric. The distribution may also have a lower range then either of the embodiments discussed above, e.g. the maximum value of CRC may be between 1000 and 1500. The distribution of FIG. 13C may also be centered on a point other than the center of the display.

In some embodiments, higher magnitudes of CRC may result in better user experience. In some embodiments, systems 1000 and 1100 (which may correspond to FIG. 13A and FIG. 13B) may result in better 3D video quality in the center of the viewing angle than system 800 (which may correspond to FIG. 13C). In some embodiments, the increased CRC displayed in FIG. 13A and FIG. 13B may be related to the lower dispersion displayed in FIG. 12, curves Pi-cell left eye 1240 and Pi-cell left eye 1250, respectively. In some embodiments, the specific arrangement of optical elements, the optical elements selected, etc. may increase or decrease the magnitude and shape of the CRC distribution.

Figure 14A:
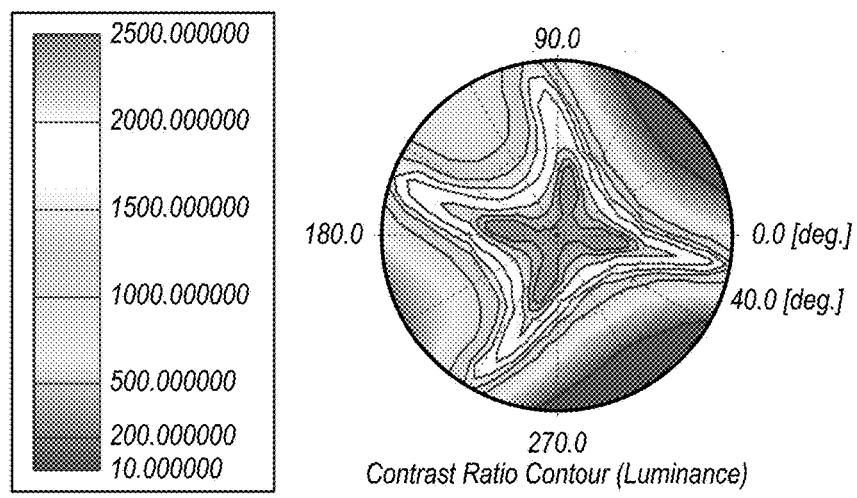
Figure 14B:
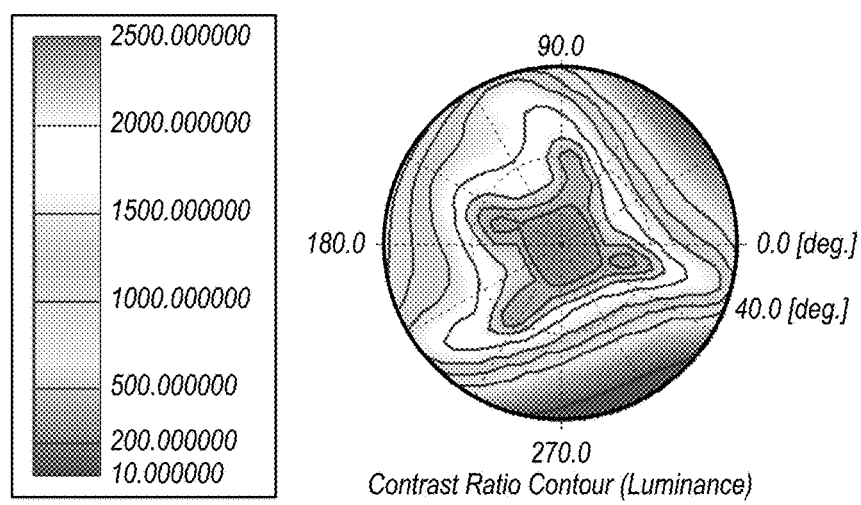
Figure 14C:
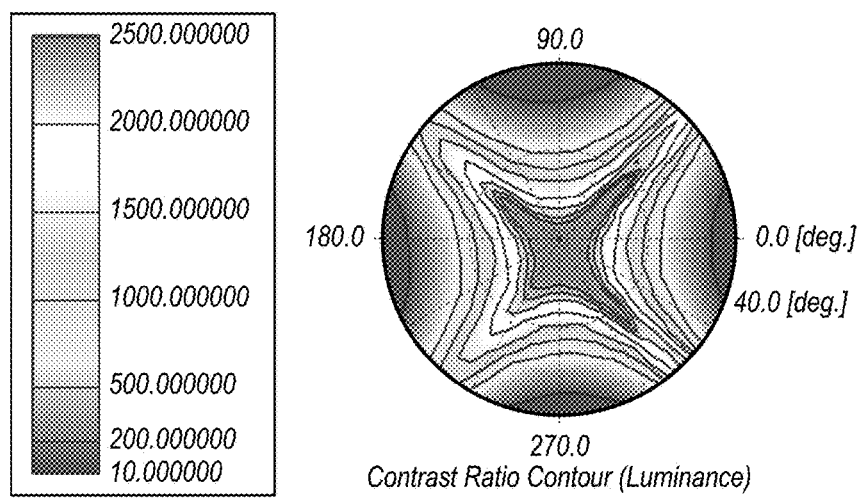

As a further example, FIGS. 14A, 14B, and 14C illustrate a viewing angle diagram similar to FIGS. 13A, 13B, and 13C. The format of the graphical displays may be similar to that of FIGS. 13A, 13B, and 13C, including a similar range of CRC and polar coordinate graph.

FIGS. 14A, 14B, and 14C display a higher maximum CRC value than the embodiments illustrated in FIGS. 13A, 13B, and 13C. FIGS. 14A, 14B, and 14C may have distributions that have maxima at the center of the polar display. Additionally, all three may have extended areas of high CRC, which may take the shape of an 'X'.

In some embodiments, the high viewing angle performance of the right eye embodiments illustrated in FIGS. 14A, 14B, and 14C may be related to the low dispersion of the optical elements. In some embodiments, the low transmission of curve Pi-cell right eye 1210 from FIG. 12 may be related to the high luminance of the FIGS. 14A and 14B.

In the embodiments previously described, left and right sides were used to describe elements of the optical system. These descriptions are not meant to limit embodiments; some embodiments may use other configurations of elements, e.g. what may be a left element in this disclosure may be used on a right side and what may be a right element in this disclosure may be used on a left side. Other configurations not limited to left or right may be used as well.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a processor, wherein the processor is configured to process video data for display;
   a display device, configured to transmit an optical signal, wherein the display device includes at least one optical element, wherein the at least one optical element is configured to change a polarization value in response to an electrical signal; and
   a wearable device, wherein the wearable device is configured to cover at least two eyes, wherein the wearable device includes at least two optical elements, and wherein properties of a first optical element and a second optical of the at least two optical elements are respectively determined based on reducing a measure of distortion in the transmitted optical signal.

2. The system of claim 1, wherein the at least one optical element of the display device comprises a Pi-cell.

3. The system of claim 1, wherein the wearable device includes one or more optical elements configured as two half-wave plates.

4. The system of claim 1, wherein a dispersion property of the first and second optical elements is based at least in part on the frequency of the optical signal.

5. The system of claim 1, wherein the at least one optical element of the display device is configured to switch polarization values at a rate configured to reduce distortion in the transmitted optical signal.

6. The system of claim 1, wherein the wearable device is configured to:
   polarize the optical signal according to a first polarization value corresponding to a first side; and
   polarize the optical signal according to a second polarization value corresponding to a second side.

7. The system of claim 1, wherein to process video data, the processor is further configured to generate left and right video streams for a three dimensional display.

8. A wearable device, configured to cover at least two eyes, comprising:
   at least a first and second optical element, wherein the first optical element is located on the left side of the wearable device, wherein the second optical element is located on the right side of the wearable device, wherein properties of the first and second optical element are respectively determined based on reducing a measure of distortion in a transmitted optical signal.

9. The wearable device of claim 8, wherein the measure of distortion includes a dispersion of the polarization of the transmitted optical signal, wherein the dispersion is based at least in part on the frequency of the transmitted optical signal.

10. The wearable device of claim 8, wherein properties of the first optical element are different from properties of the second optical element.

11. The wearable device of claim 8, wherein the transmitted optical signal comprises three dimensional video data.

12. The wearable device of claim 8, wherein the transmitted optical signal is transmitted by a device comprising at least one light source and at least a third optical element, wherein the third optical element is configured to change a polarization value in response to an electrical signal.

13. The wearable device of claim 12, wherein the third optical element of the display device is configured to switch polarization values at a rate configured to reduce distortion in the transmitted optical signal.

14. The wearable system of claim 12, wherein the third optical element comprises a surface mode device.

15. A system, comprising:
- a first device configured to transmit light, wherein the first device comprises at least one optical element configured to change a polarization value in response to an electrical signal;
- a second device configured to receive the transmitted light, wherein the second device comprises at least one optical element, wherein the optical element is configured to reduce a measure of distortion in the transmitted light.

16. The system of claim 15, wherein the first device comprises a liquid crystal display (LCD) and wherein the second device comprises eyewear.

17. The system of claim 15, wherein the transmitted light is circularly polarized.

18. The system of claim 15, wherein the at least one optical element of the first device comprises a Pi-cell.

19. The system of claim 15, wherein the at least one optical element of the first device is configured to switch polarization values at a rate configured to reduce distortion in the transmitted light.

20. The system of claim 15, wherein the measure of distortion includes a dispersion of the polarization of the signal, wherein the dispersion is based at least in part on frequencies of the light.

* * * * *